US012149985B2

(12) United States Patent
Newman et al.

(10) Patent No.: US 12,149,985 B2
(45) Date of Patent: *Nov. 19, 2024

(54) ARTIFICIAL INTELLIGENCE FOR OPTIMIZING 5G/6G WIRELESS NETWORK PERFORMANCE

(71) Applicants: David E. Newman, Poway, CA (US); R. Kemp Massengill, Palos Verdes, CA (US)

(72) Inventors: David E. Newman, Poway, CA (US); R. Kemp Massengill, Palos Verdes, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/224,231

(22) Filed: Jul. 20, 2023

(65) Prior Publication Data

US 2023/0362720 A1 Nov. 9, 2023

Related U.S. Application Data

(63) Continuation of application No. 17/990,018, filed on Nov. 18, 2022, now Pat. No. 11,832,128, which is a
(Continued)

(51) Int. Cl.
*H04W 24/06* (2009.01)
*H04B 17/373* (2015.01)
(Continued)

(52) U.S. Cl.
CPC .......... *H04W 28/04* (2013.01); *H04B 17/373* (2015.01); *H04B 17/382* (2015.01);
(Continued)

(58) Field of Classification Search
CPC .... H04W 28/04; H04W 24/06; H04B 17/373; H04B 17/382; H04B 17/3913;
(Continued)

(56) References Cited

U.S. PATENT DOCUMENTS 5,606,578 A 2/1997 O'Dea
5,860,136 A 1/1999 Fenner
(Continued)

FOREIGN PATENT DOCUMENTS

| KR | 1020110125671 | 11/2011 |
| WO | 2006106459 | 10/2006 |
| WO | 2015070087 | 5/2015 |

OTHER PUBLICATIONS

Hiraguri et al., Transmission Queueing Schemes for Improving Downlink Throughout on IEEE 802.11 WLANs, 2011.

*Primary Examiner* — Gbemileke J Onamuti

(57) ABSTRACT

5G and 6G wireless networks can use artificial intelligence models to optimize performance by measuring the rate of message faults, and in particular the rate of various types of faults. For example, the amplitude faults include a modulation amplitude distorted by a small or large amplitude change, and whether the faults cluster in the high or low amplitude modulation portions of a constellation chart, among many other inputs related to network operations. The artificial intelligence model can be configured to predict the subsequent network performance according to each modulation scheme available to the network, thereby enabling the network to select a more effective modulation scheme. Alternatively, the artificial intelligence model can select the preferred modulation scheme and recommend the change to the network operators, or it can implement the change automatically if enabled to do so.

20 Claims, 11 Drawing Sheets

Related U.S. Application Data continuation of application No. 17/737,366, filed on May 5, 2022, now Pat. No. 11,510,096, which is a continuation of application No. 17/484,132, filed on Sep. 24, 2021, now abandoned, which is a continuation of application No. 17/203,208, filed on Mar. 16, 2021, now Pat. No. 11,153,780, which is a continuation of application No. 17/203,233, filed on Mar. 16, 2021, now Pat. No. 11,206,169.

(60) Provisional application No. 63/113,420, filed on Nov. 13, 2020, provisional application No. 63/151,270, filed on Feb. 19, 2021, provisional application No. 63/157,090, filed on Mar. 5, 2021, provisional application No. 63/159,195, filed on Mar. 10, 2021, provisional application No. 63/159,238, filed on Mar. 10, 2021, provisional application No. 63/159,239, filed on Mar. 10, 2021.

(51) Int. Cl.

| | | |
|---|---|---|
| *H04B 17/382* | (2015.01) | |
| *H04B 17/391* | (2015.01) | |
| *H04L 1/00* | (2006.01) | |
| *H04L 1/1812* | (2023.01) | |
| *H04L 27/34* | (2006.01) | |
| *H04L 27/36* | (2006.01) | |
| *H04L 43/0823* | (2022.01) | |
| *H04W 28/04* | (2009.01) | |

(52) U.S. Cl.
CPC ....... *H04B 17/3913* (2015.01); *H04L 1/0005* (2013.01); *H04L 1/1812* (2013.01); *H04L 27/3444* (2013.01); *H04L 27/3494* (2013.01); *H04L 27/364* (2013.01); *H04L 43/0823* (2013.01); *H04W 24/06* (2013.01)

(58) Field of Classification Search
CPC . H04L 1/0005; H04L 1/1812; H04L 27/3444; H04L 27/3494; H04L 27/364; H04L 43/0823
USPC .......................................................... 370/329
See application file for complete search history.

(56) References Cited

U.S. PATENT DOCUMENTS

| | | |
|---|---|---|
| 5,861,036 A | 1/1999 | Godin |
| 5,959,552 A | 9/1999 | Cho |
| 6,359,553 B1 | 3/2002 | Kopischke |
| 6,420,996 B1 | 7/2002 | Stopczynski |
| 6,496,764 B1 | 12/2002 | Wang |
| 6,597,974 B2 | 7/2003 | Roelleke |
| 6,691,227 B1 | 2/2004 | Neves |
| 6,816,447 B1 | 11/2004 | Lee |
| 6,831,572 B2 | 12/2004 | Strumolo |
| 7,016,782 B2 | 3/2006 | Schiffmann |
| 7,177,294 B2 | 2/2007 | Chen |
| 7,409,295 B2 | 8/2008 | Paradie |
| 7,600,039 B2 | 10/2009 | Tang |
| 7,696,863 B2 | 4/2010 | Lucas |
| 7,840,354 B2 | 11/2010 | Knoop |
| 7,966,127 B2 | 6/2011 | Ono |
| 8,447,472 B2 | 5/2013 | Joh |
| 8,463,500 B2 | 6/2013 | Cuddihy |
| 8,538,674 B2 | 9/2013 | Breuer |
| 8,849,515 B2 | 9/2014 | Moshchuk |
| 9,108,582 B1 | 8/2015 | Kozloski |
| 9,165,469 B2 | 10/2015 | Bowers |
| 9,250,324 B2 | 2/2016 | Zeng |
| 9,318,023 B2 | 4/2016 | Moshchuk |
| 9,398,594 B2 | 7/2016 | Benveniste |
| 9,701,307 B1 | 7/2017 | Newman |
| 9,729,299 B2 | 8/2017 | Barriac |
| 9,896,096 B2 | 2/2018 | Newman |
| 9,979,643 B2 | 5/2018 | Tosaka |
| 10,489,303 B2 | 11/2019 | Swaine |
| 10,499,302 B1 | 12/2019 | Mclennan |
| 10,547,487 B1 | 1/2020 | Zhang |
| 10,939,471 B2 | 3/2021 | Newman |
| 2003/0067219 A1 | 4/2003 | Seto |
| 2003/0080543 A1 | 5/2003 | Takagi |
| 2003/0193889 A1 | 10/2003 | A. Jacobsen |
| 2004/0030498 A1 | 2/2004 | Knoop |
| 2004/0117081 A1 | 6/2004 | Mori |
| 2004/0120292 A1 | 6/2004 | Trainin |
| 2004/0122578 A1 | 6/2004 | Isaji |
| 2004/0193374 A1 | 9/2004 | Hae |
| 2005/0107955 A1 | 5/2005 | Isaji |
| 2005/0131646 A1 | 6/2005 | Camus |
| 2005/0280520 A1 | 12/2005 | Kubo |
| 2006/0091654 A1 | 5/2006 | De Mersseman |
| 2006/0109094 A1 | 5/2006 | Prakah-Asante |
| 2006/0268878 A1 | 11/2006 | Jung |
| 2006/0282218 A1 | 12/2006 | Urai |
| 2007/0029753 A1 | 2/2007 | Habetha |
| 2007/0080825 A1 | 4/2007 | Shiller |
| 2007/0112516 A1 | 5/2007 | Taniguchi |
| 2007/0219672 A1 | 9/2007 | Fehr |
| 2007/0282530 A1 | 12/2007 | Meister |
| 2008/0208408 A1 | 8/2008 | Arbitmann |
| 2008/0319610 A1 | 12/2008 | Dechsle |
| 2009/0066492 A1 | 3/2009 | Kubota |
| 2009/0182465 A1 | 7/2009 | Wilke |
| 2009/0192683 A1 | 7/2009 | Kondou |
| 2009/0292468 A1 | 11/2009 | Wu |
| 2009/0299593 A1 | 12/2009 | Borchers |
| 2011/0035116 A1 | 2/2011 | Ieda |
| 2011/0135029 A1 | 6/2011 | Jianming |
| 2011/0149881 A1 | 6/2011 | Gong |
| 2011/0178710 A1 | 7/2011 | Pilutti |
| 2011/0307139 A1 | 12/2011 | Caminiti |
| 2012/0078472 A1 | 3/2012 | Neal |
| 2012/0083947 A1 | 4/2012 | Anderson |
| 2012/0101713 A1 | 4/2012 | Moshchuk |
| 2012/0230262 A1 | 9/2012 | Benveniste |
| 2012/0330542 A1 | 12/2012 | Hafner |
| 2013/0003661 A1 | 1/2013 | Matsuo |
| 2013/0030651 A1 | 1/2013 | Moshchuk |
| 2013/0054128 A1 | 2/2013 | Moshchuk |
| 2013/0136013 A1 | 5/2013 | Kneckt |
| 2013/0166150 A1 | 6/2013 | Han |
| 2014/0039786 A1 | 2/2014 | Schleicher |
| 2014/0049646 A1 | 2/2014 | Nix |
| 2014/0087749 A1 | 3/2014 | Mar |
| 2014/0142798 A1 | 5/2014 | Guamizo |
| 2014/0156157 A1 | 6/2014 | Johnson |
| 2014/0307658 A1 | 10/2014 | Vedantham |
| 2015/0003251 A1 | 1/2015 | Shaffer |
| 2015/0172012 A1 | 6/2015 | Abeysekera |
| 2015/0201413 A1 | 7/2015 | Seo |
| 2015/0239413 A1 | 8/2015 | Kozloski |
| 2015/0249515 A1 | 9/2015 | Wu |
| 2016/0044693 A1 | 2/2016 | Sun |
| 2016/0095139 A1 | 3/2016 | Ding |
| 2016/0112999 A1 | 4/2016 | Kosaka |
| 2016/0203719 A1 | 7/2016 | Divekar |
| 2016/0254691 A1 | 9/2016 | Koo |
| 2016/0288799 A1 | 10/2016 | Nguyen Van |
| 2016/0345362 A1 | 11/2016 | Lee |
| 2017/0055294 A1 | 2/2017 | Lee |
| 2017/0127433 A1 | 5/2017 | Lin |
| 2017/0144391 A1 | 5/2017 | Kim |
| 2017/0188352 A1 | 6/2017 | Lee |
| 2017/0236340 A1 | 8/2017 | Hagan |
| 2017/0337813 A1 | 11/2017 | Taylor |
| 2018/0077726 A1 | 3/2018 | Boger |
| 2018/0109976 A1 | 4/2018 | Ly |
| 2018/0123839 A1 | 5/2018 | Chung |
| 2018/0337846 A1 | 11/2018 | Lee |
| 2019/0158257 A1 | 5/2019 | Sano |

(56) References Cited

U.S. PATENT DOCUMENTS

| | | |
|---|---|---|
| 2019/0173726 A1 | 6/2019 | Wong |
| 2019/0188997 A1 | 6/2019 | Gilson |
| 2019/0191376 A1 | 6/2019 | Kim |
| 2019/0191464 A1 | 6/2019 | Loehr |
| 2019/0200404 A1 | 6/2019 | Yu |
| 2020/0383030 A1 | 12/2020 | Cho |
| 2021/0064996 A1 | 3/2021 | Wang |
| 2021/0135733 A1 | 5/2021 | Huang |
| 2021/0185700 A1 | 6/2021 | Pezeshki |
| 2021/0195457 A1 | 6/2021 | Kim |
| 2021/0195629 A1 | 6/2021 | Chauvin |
| 2021/0235302 A1 | 7/2021 | Chande |

FIG. 9

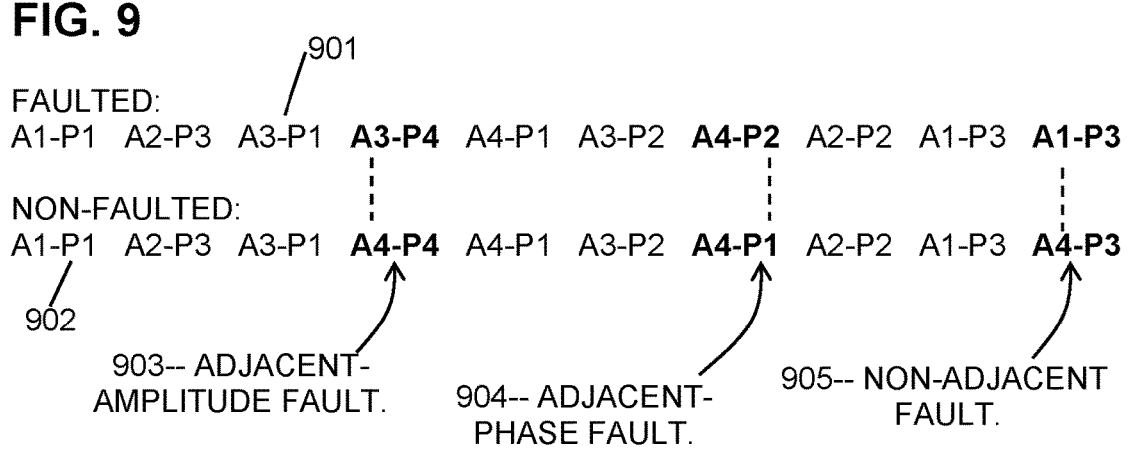

FIG. 10

| FAULT PATTERN | MITIGATION OPTIONS |
|---|---|
| ADJACENT-AMPLITUDE | REDUCE NUMBER OF AMPLITUDE LEVELS. |
| ADJACENT-PHASE | REDUCE NUMBER OF PHASE LEVELS. |
| BOTH ADJACENT-AMPLITUDE AND ADJACENT-PHASE | MAKE ALTERNATE STATES INVALID IN PORTION OF TABLE. |
| NON-ADJACENT FAULTS | INCREASE NUMBER OF AMPLITUDE AND PHASE LEVELS, FASTER MESSAGES. |
| LOW-AMPLITUDE FAULTS | INCREASE LEVEL SEPARATION AT LOW AMPLITUDE PART OF TABLE. |
| HIGH-AMPLITUDE FAULTS | INCREASE LEVEL SEPARATION AT HIGH AMPLITUDE PART OF TABLE. |
| FAULTS THROUGHOUT TABLE | MAKE ALTERNATE STATES INVALID THROUGHOUT TABLE, OR INCREASE TRANSMISSION POWER. |

ARTIFICIAL INTELLIGENCE FOR OPTIMIZING 5G/6G WIRELESS NETWORK PERFORMANCE

PRIORITY CLAIMS AND RELATED APPLICATIONS

This application is a continuation of U.S. patent application Ser. No. 17/990,018, entitled "Fault Detection and Mitigation Based on Fault Types in 5G/6G", filed Nov. 18, 2022, which is a continuation of U.S. patent application Ser. No. 17/737,366, entitled "Selecting a Modulation Table to Mitigate 5G Message Faults", filed May 5, 2022, which is a continuation of U.S. patent application Ser. No. 17/484,132, entitled "Selecting a Modulation Table to Mitigate 5G Message Faults", filed Sep. 24, 2021, which is a continuation of U.S. patent application Ser. No. 17/203,208, entitled "Selecting a Modulation Table to Mitigate 5G Message Faults", filed Mar. 16, 2021, which claims the benefit of U.S. Provisional Patent Application Ser. No. 63/113,420, entitled "Wireless Modulation for Mitigation of Noise and Interference", filed Nov. 13, 2020, and U.S. Provisional Patent Application No. 63/151,270, entitled "Wireless Modulation for Mitigation of Noise and Interference", filed Feb. 19, 2021, and U.S. Provisional Patent Application No. 63/157,090, entitled "Asymmetric Modulation for High-Reliability 5G Communications", filed Mar. 5, 2021, and U.S. Provisional Patent Application No. 63/159,195 entitled "Asymmetric Modulation for High-Reliability 5G Communications", filed Mar. 10, 2021, and U.S. Provisional Patent Application No. 63/159,238 entitled "Selecting a Modulation Table to Mitigate 5G Message Faults", filed Mar. 10, 2021, and U.S. Provisional Patent Application No. 63/159,239 entitled "Artificial Intelligence for Predicting 5G Network Performance", filed Mar. 10, 2021, all of which are hereby incorporated by reference in their entireties.

FIELD OF THE INVENTION

Disclosed herein are systems and methods for transmitting wireless messages, and more specifically for modulating wireless signals in 5G to mitigate noise and interference, selecting a particular modulation table, and using AI (artificial intelligence) methods to mitigate observed faults.

BACKGROUND OF THE INVENTION

In wireless networking, noise and interference are always present. Often noise and/or interference are the limiting factors in messaging reliability. Noise also affects throughput by forcing frequent retransmit requests, backoff delays, and dropped messages. With the opening of higher frequencies in 5G and future 6G systems, phase noise is expected to be increasingly problematic. The rapid proliferation of wireless users, including machine-type nodes in high-density environments, is expected to make the interference problem exponentially worse. What is needed is means for mitigating noise and interference while providing improved throughput and reliability suitable for the high multi-GHz frequency bands and the extremely high spatial density of nodes in the next generation of wireless networking.

Various attempts have been made to address the above issues. An article by Kim and Lee (Optics Communications 474 (2020) 126084) mentions non-square modulation tables in the context of optical fiber communications. Their attempt includes various odd-bit-number modulation tables such as 512QAM, which encodes 9 bits, but is otherwise standard (and square). An article by Lee et al (IEEE Transaction on Broadcasting (2017) DOI: 10.1109/TBC.2016.2619583) mentions non-square modulation, but in the context of DOCSIS (Data Over Cable Service Interface Specification), which is entirely different from 5G wireless RF messaging. And similar to the Kim-Lee article, the article refers to 512QAM and the like. A U.S. Pat. No. 10,158,451 to Arambepola et al purports to provide a way to map bit streams to modulated symbols, and includes mixtures of tables. Referring to QAM2048, the reference terms the same "non-square", but in fact it has square symmetry. In short, these all have square symmetry. Finally, a US Patent Application 2016/0337081 to Jung et al is directed to figuring out an unknown modulation table by looking at an incoming signal. All of these references are deficient in providing the type of high-speed high-reliability wireless messaging necessary for today's communications.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

Responsive to the problems listed above, systems and methods presented below can provide network operators with a range of modulation solutions that enable nuanced and fine-grained mitigation of message failure modes. While prior-art modulation tables generally allow only large-step responses to transmission faults, such as dropping from 256QAM to 64QAM or 16QAM, asymmetric modulation tables according to present principles can offer more precise adjustment of noise margins using modulation tables configured to mitigate specific failure modes, and thereby avoid costly retransmission, signal corruption, and dropped message issues. Means (including AI means) for selecting among available modulation tables, adjusting or optimizing a table according to observed message fault types, and predicting network performance according to a selected modulation table, are also detailed below.

In a first aspect, there is a method for a base station of a wireless network, the method comprising: using a first modulation scheme comprising Nstate modulation states, each modulation state comprising amplitude modulation according to integer Namp predetermined amplitude levels; receiving multiple uplink messages, each uplink message comprising symbols, each symbol occupying one resource element of a resource grid, each symbol modulated according to the first modulation scheme; determining a rate of adjacent-amplitude faults and a rate of nonadjacent-amplitude faults, wherein: an adjacent-amplitude fault comprises a symbol transmitted according to a first predetermined amplitude level and received according to a second predetermined amplitude level adjacent to the first predetermined amplitude level; a nonadjacent-amplitude fault comprises a symbol transmitted according to a first predetermined amplitude level and received according to a second predetermined amplitude level which is not adjacent to the first predetermined amplitude level; and selecting a second modulation scheme according to the rate of adjacent-amplitude faults and the rate of nonadjacent-amplitude faults.

In another aspect, there is a method for a user device of a wireless network, the method comprising: receiving downlink messages comprising symbols, each symbol occupying a single resource element of a resource grid and modulated according to a first modulation scheme comprising amplitude modulation according to Namp predetermined amplitude levels; determining a rate of message faults in the downlink messages, wherein a message fault comprises a symbol transmitted according to a first amplitude level and measured, by the user device, according to a different second amplitude level; transmitting, to a base station of the wireless network, an uplink message indicating the rate of message faults; and receiving, from the base station, an RRC (radio resource control) message recommending a second modulation scheme.

In another aspect, there is a method for a core network of a wireless network to improve network performance, the method comprising: using an artificial intelligence model configured to take, as input, at least a current modulation scheme and a current message fault rate, and to provide, as output, at least a suggested modulation scheme and a predicted fault rate according to the suggested modulation scheme.

Systems and methods according to present principles provide improved and optimized techniques and devices for high-speed communications. In contrast to those of the prior art, systems and methods according to present principles employ asymmetric or non-square modulation tables in 5G wireless RF messaging, which are termed and defined in various ways described below, and which provide for particularly enhanced high-speed communications. For example, in contrast to certain of the prior art, certain arrangements of systems and methods according to present principles assume that the base station and the user node already agree as to which modulation table is in use, and thus there is no need to determine it from the received signal. There is, on the other hand, need for selecting an appropriate modulation table, from available modulation tables, and for adjusting or optimizing tables, to mitigate observed fault modes. AI systems and methods presented herein can assist in such selecting, adjusting, and optimizing.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

FIG. 9 is a schematic representation of exemplary symbols in faulted and unfaulted messages illustrating fault types, according to some embodiments.

FIG. 10 is a graphic indicating exemplary mitigation options for mitigating certain message fault types, according to some embodiments.

Like reference numerals refer to like elements throughout.

DETAILED DESCRIPTION

Figure 1:
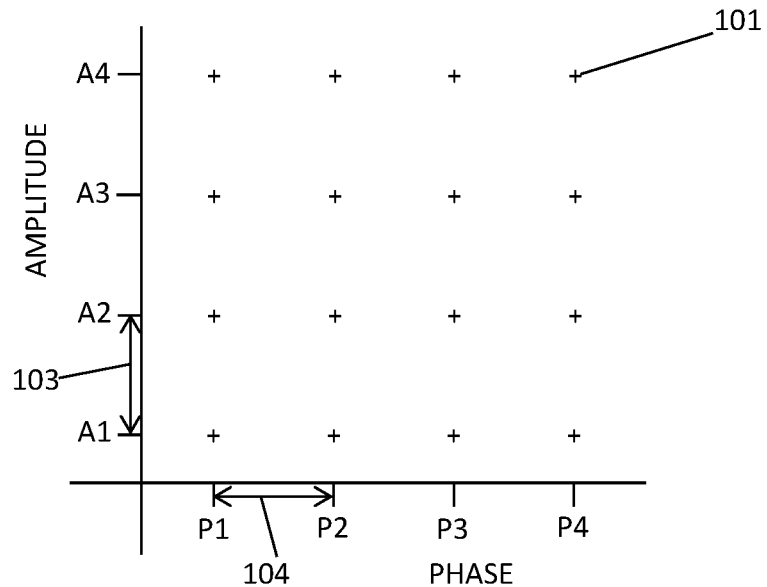
FIG. 1 is a schematic showing a square-symmetric modulation table according to prior art.

Systems and methods are disclosed herein (the "systems" and "methods", also occasionally termed "embodiments" or "arrangements", generally according to present principles) that can provide urgently needed protocols to mitigate noise and interference in 5G wireless networking by providing modulation options, particularly amplitude and phase modulation tables, beyond those currently available. The systems and methods also include means, including AI (artificial intelligence) means, for predicting network performance according to the modulation scheme in use, for selecting a modulation scheme according to message faults observed, and for optimizing the performance of particular modulation schemes, based on message failure modes.

Widely used modulation options in 5G include 16QAM, 64QAM, 256QAM, and 1024QAM wherein the indicated number is the number of distinct modulation states in a modulation table, and QAM stands for quadrature amplitude modulation (that is, modulation of both phase and amplitude). Such modulation tables indicate how the amplitude and phase of a wireless signal may be modulated to encode digital information. The wireless message consists of sequential modulated "symbols", each symbol being a period of uniformly modulated signal at a particular frequency and time. For example, 16QAM has 16 distinct modulation states, formed by four amplitude levels and four phase levels being applied simultaneously to an RF (radio-frequency) wave. Likewise 256QAM has 16 amplitude levels and 16 phase levels, which when combined form 256 distinct modulation states, and 1024QAM with 32 phase and amplitude levels forming 1024 distinct states. Symbolically, the number of amplitude levels may be represented as Namp, the number of phase levels is Nphase, and (Namp×Nphase)=Nstates is the number of phase-amplitude combinations or states in the table, each of which is a modulation state. More generally, the modulation table may be a data structure, such as an array stored in a computer readable medium, used for modulating symbols of a transmitted message. Each of the prior-art modulation tables is "symmetric" or "square-symmetric". A symmetric array, as used herein, is a two-dimensional array that, when rotated by 90 degrees, remains isomorphic (same shape) as the original. Moreover, each of these modulation tables has an equal number of amplitude levels and phase levels (Namp=Nphase), the various amplitude levels are evenly or uniformly spaced apart when specified in some units, the phase levels are equally spaced apart, the number of distinct modulation states in the table is equal to the product of the number of amplitude levels times the number of phase modulation levels, and each of the distinct states is a valid amplitude-phase modulation state for modulating each symbol of the message. In addition, the number of levels (Namp or Nphase) is a power of 2 and the number of states Nstates is a power of 4. More specifically, the number of amplitude or phase levels is 2N, where N=2, 3, 4, 5 for 4, 8, 16, 32 levels respectively. The number of valid states is equal to the number of states which is $2^{2N}=4^N=16, 64, 256, 1024$ for N=2, 3, 4, 5 respectively. Each state can encode a number of binary bits equal to the logarithm, in base 2, of the number of states, or $\log_2(2^N)=2N$. Thus the number of bits per symbol in a symmetrical modulation table is 4, 6, 8, 10 for N=2, 3, 4, 5 respectively. Modulation tables with larger numbers of distinct states are thus able to convey information faster than smaller modulation tables, by encoding more bits per symbol. However, larger tables are usually more susceptible to noise and interference, due to the reduced separation between modulation states. The effect of noise may be greatest for the lowest amplitude modulation states since these are generally the states with the lowest SNR (signal-to-noise ratio). Network operators may be forced to use higher transmission power than otherwise necessary, to overcome demodulation faults which may be concentrated in the lowest-amplitude modulated signal states. In addition, phase noise becomes an increasing problem at high frequencies, especially at the multi-GHz frequencies planned for 5G and beyond. Noise and interference may result in frequent transmission faults, leading to message failures with subsequent delays and retransmission attempts. Wireless networks may therefore be forced to use lower degrees of modulation to regain reliable message transmission at high frequencies.

Amplitude is generally specified in volts or microvolts, alternatively in watts or microwatts or dB (decibels), and phase in degrees or radians. In 5G systems, the received amplitude levels are compared to DMRS (demodulation reference signal) symbols, or the like, which serve as amplitude calibrations. Phase measurements on the received signal are compared to PTRS (phase tracking reference signal) messages, or the like, that calibrate the phase. When discussing symmetry, it is convenient to normalize the amplitude levels and phase levels of a modulation table, so that the plotted values are unitless and range from 0 to 1. For example, if the allowed amplitude levels are {Vmin, V2, ... Vn, ... Vmax}, then the corresponding normalized amplitude value An for level number "n" may be An=(Vn−Vmin)/(Vmax−Vmin) which is unitless and ranges from 0 to 1. Likewise the phase values may be {Dmin, D2, ... Dn ... Dmax} and the corresponding normalized phase values Pn may be Pn=(Dn−Dmin)/(Dmax−Dmin). In summary, symmetric modulation tables generally have the same number of amplitude levels and phase levels, and the number of such levels is a power of 2, the levels are equally spaced, and all states in the table are valid.

Disclosed herein are "asymmetric" modulation tables that can, in some implementations, enable network operators to mitigate particular noise problems in real-time, according to some embodiments. An "asymmetric" array, as used herein, is an array that violates square symmetry in that it is not isomorphic to its 90-degree rotation. For example, a "rectangular" array has 180-degree rotation symmetry, but not 90-degree rotation symmetry. Exemplary asymmetric modulation tables, discussed below, are characterized by at least one of: (1) the number of phase levels is different from the number of amplitude levels; (2) the number of amplitude levels is an integer other than a power of two; (3) the number of phase levels is an integer other than a power of two; (4) the number of states in the modulation table is an integer other than a power of two; (5) the spacing of the phase levels is non-uniform; (6) the spacing of the amplitude levels is non-uniform; (7) at least one of the modulation states in the table is invalid or unavailable for modulation; and (8) combinations thereof. The number of valid states is Nvalid and the number of invalid states is Ninvalid. Since every state is either valid or invalid, the total number of states equals the valid plus invalid states: Nstates=Nvalid+Ninvalid. In some cases it is informative to determine whether errors occur primarily in a low amplitude region of the modulation table or a high amplitude region, or uniformly throughout the table. A dividing line between the low and high amplitude regions may be a midpoint among the amplitude levels, or elsewhere. In this case, every state is either a low amplitude or a high amplitude state. The number of low amplitude states Nlow plus the number of high amplitude states Nhigh then equals the number of total states in the table, Nlow+Nhigh=Nstates=Namp×Nphase.

An asymmetric modulation table, according to some embodiments, may include a number of amplitude levels different from the number of phase levels; the numbers of amplitude and phase levels can be any integer, including integers other than powers of 2; the amplitude level spacing can be non-uniform and the phase level spacing can be non-uniform; and some of the states of the table may be invalid (that is, not used for modulating symbols) whereas other states may be determined as "valid" and legal for modulation. Amplitude levels are "non-uniformly spaced" if the separations between the various amplitude levels differ by more than a predetermined limit, such as 1% or 5% or 10% or 25% or 50% of each separation, for example. Asymmetric or non-square-symmetric modulation tables can provide valuable options enabling network operators to mitigate amplitude noise or phase noise, or a combination, while maintaining a high message throughput, according to some embodiments. Use of an asymmetric modulation table according to present principles can thereby enable wireless networks to avoid message faults due to demodulation errors, resulting in fewer message faults, higher message throughput, and enhanced user satisfaction. As used herein, the message "throughput" is the number of messages successfully transmitted and received in the network per unit time. A message failure rate is the number of failed messages per unit time. A message is "faulted" or "failed" if its symbols disagree with an embedded CRC (cyclic redundancy check) code or equivalent error-check code, and is "successful" otherwise. A failed message generally contains at least one "faulted" symbol (or symbol modulation fault) which is a symbol that was modulated with one value but demodulated with a different value, usually due to noise or interference.

The systems and methods further disclose methods for determining whether a network can reduce message faults by switching to a different modulation table according to fault types observed, and for selecting which table would be more effective, and for optimizing the performance of that table. For example, a node (user or base station) may receive a message, read an embedded CRC code or the like, compare to the received message symbols, and thereby determine that the message is faulted. The node may then request a retransmitted message, and if the retransmitted message is unfaulted, the node can compare the two versions symbol-by-symbol. By determining which symbols are different, and how they differ, the node can determine which types of faults occurred. For example, if symbols were altered in phase, causing them to switch to an adjacent phase state in the table ("adjacent-phase" faults), then the network may choose to switch to another modulation table with greater separation between phase states. Modulation faults between adjacent amplitude levels ("adjacent-amplitude" faults) may indicate the need for a table with greater separation between amplitude levels. If adjacent-amplitude faults occur mainly in the lower (low-amplitude) portion of the table, then another table with greater spacing between amplitude levels at the low-amplitude end of the table may be needed. However, if faults appear similarly in the low-amplitude and high-amplitude regions of the table, then a different modulation table with greater separation of both amplitude and phase states may be a better choice. If the faults are non-adjacent, that is, symbol distortion is larger than the level spacing, then the faults are likely not due to noise, but rather from pulsatile interference that overwhelms the signal occasionally. In that case a table with greater separation between states is likely to be futile because the distortions are too large. Instead, a better strategy may be to switch to a table with even smaller level separations, and therefore more modulation states, in order to reduce the time required to transmit each message. The shorter-duration message may thereby finish before the interference strikes again. By comparing faulted and unfaulted versions of the same message and determining specifically the modulation errors that caused the fault, the node can select a more appropriate modulation table for reduced message failure rates or improved throughput, according to some embodiments.

Typically the base station (or core network) may detect and tally the types of message faults that it observes, and the user nodes may do the same and periodically communicate their totals to the base station. The base station (or core network) can then process all that data along with other input such as the traffic density, the distribution of message sizes, the distribution of frequent and infrequent users, the presence and type of external noise or interference, the distribution of priorities among the messages, and many other parameters, in determining how to optimize the modulation table. In addition, the base station may assign a different modulation table to each user node, and may individually optimize each such table. Typically the base station can inform the user node or nodes of such a change in modulation table using an RRC (radio resource control) message or a broadcast message or a unicast downlink message to the user node or nodes that are to switch to the new modulation table. Thereafter, those user nodes may employ the selected new modulation table for modulating symbols of further messages, such as data messages uploaded to the base station on the PUSCH (physical uplink shared channel) or RACH (random access channel) or other suitable frequency.

In one embodiment, a base station or a user node can determine a message failure rate by counting the number of failed messages or the number of faulted symbols in the failed messages, per unit time, and then vary one of the amplitude levels either up or down in value, and then measure the message failure rate again. If the message failure rate goes down, the amplitude level can be varied further in the same direction, and if it goes up, the variation can be reversed. This iterative process can be continued until an optimal, or at least a satisfactory, setting has been achieved.

More generally, a base station or core network may decide to change a network setting or procedure in use, responsive to a tally or analysis of the types of message failures observed. In contrast to prior-art network management in which changes may be based on an undifferentiated message failure rate, embodiments according to present principles can instead determine which types of message failures occurred and under which circumstances, such as increased adjacent-amplitude and adjacent-phase faults at low amplitudes, among many other possible fault types. The network can then select a suitable change to mitigate the particular types of faults most often detected, and thereby improve both the message throughput and the failure rate, and usually the average delay time per message as well. Network management and decision-making based on the types of message failures encountered, rather than the gross failure rate, can thereby enable nuanced and problem-specific solutions, leading to improved network performance and greater user satisfaction.

The base station is typically very busy in 5G, and may have difficulty performing the complex multi-dimensional optimization required. Therefore, means including AI means are disclosed for predicting future network performance according to the current operating conditions and the types of message faults currently observed. With such predictions, networks may select which modulation table to use in particular circumstances, and may also perform optimizations, such as optimizing an amplitude level to minimize faulting for example. Alternative AI means are disclosed for preparing an algorithm that enables the base station (or core network) to predict network performance based on each available modulation table, and thereby select a suitable modulation table for the current conditions. Algorithm means are also disclosed for adjusting variables in a modulation table, such as an amplitude level, for further improvements in network performance. With such an algorithm, the base station or core network may switch to the better modulation table and thereby provide reduced message failures and an improved networking experience for the users overall.

Typically an optimization based on AI includes a mathematical AI structure in a computer. The AI structure may include a plurality of input parameters, at least one output parameter, and a plurality of intermediate functions (or "propagation" functions). The inputs, intermediate functions, and outputs are connected together by directed "links" representing the transfer of processed information between these entities. In some embodiments, the AI structure may be a neural net (cascaded decision tree with adjustable interdependent functional neurons), a hidden Markov model (array of nodes operationally dependent in a complex, usually unknown, manner), or other means for calculating the output parameter from the input parameters. For example, the input parameters may be the number or rate of message failures of each type, such as Famp for adjacent-amplitude faults, Fphase for adjacent-phase faults, and Fnonadjacent for non-adjacent type faults, and optionally Flow and Fhigh for faulted states in the lower or higher amplitude regions of the table respectively, as well as other failure modes that may be detected. The input parameters preferably include at least one parameter of the current modulation table, in use when those faults are observed. The modulation table parameter(s) may include the number of amplitude and phase levels, the number of states in the table, separations between the amplitude or phase levels, presence or absence of invalid states, and the like. The output or outputs may include network performance metrics such as the message throughput, the message failure rate, an average delay time, a dropped message rate, and combinations thereof, as well as other measures of interest regarding the performance of the network. The network performance may be a composite performance metric, such as the message throughput minus ten times the message failure rate, or some other measure of interest to network operators. The intermediate functions are functions or computer codes that depend on the input parameters or other higher-level intermediate functions. The intermediate functions may be linear functions such as weighted sums, or nonlinear functions, or other combination of the parameters, and may also include logical combinations of the parameters such as Boolean combinations. Often the intermediate functions are connected in layers, such that the first layer receives data from the input parameters and passes its processed results to the second layer, which further combines and processes the information, and then finally the last layer feeds all of its processed data to the outputs. Thus the output parameter(s) depend functionally on the intermediate functions, and indirectly on the inputs. In addition, each dependency (or "link") may also be weighted, and the weight may be variable. In one example, each intermediate function may be a weighted (including negatively weighted) sum of the higher-layer intermediate function results. The AI structure may thereby embody a directed, weighted, acyclic or feed-forward, "graph" or tree. (Recursive-type graphs, with backward links or sidelinks, may also be used, although convergence is then not guaranteed.)

The intermediate functions generally include variable values that may be "tuned" or "trained", meaning that the variables are adjusted so that the final output of the structure approaches measured data or other desired output. In the current application, the variable values may be adjusted to provide a prediction. For example, the output parameter may be a prediction of a network performance metric. The values may be iteratively adjusted until the output parameter predicts the network performance metric to sufficient accuracy. For example, in a neural net, each intermediate function (called a "neuron" in analogy to brain cells) may include a number of weights and thresholds, and optionally logic elements, by which the input parameters or the results of previous intermediate functions may be combined. An example of a linear intermediate function may be the formula "v1 times the adjacent-amplitude fault rate plus v2 times the adjacent-phase fault rate minus v3 times the non-adjacent fault rate", where v1, v2, and v3 are adjustable "weights" or weighting coefficients applied to the input links, and the output of the function is provided to the next layer or the output layer. An example of a non-linear or logical intermediate function may be "select the larger of the adjacent-amplitude and v4 times the adjacent-phase fault rates if either one is larger than v5 times the non-adjacent fault rate, and select the square root of the inverse of the non-adjacent fault rate otherwise". The values v1-v5 and so forth may be adjusted to optimize the predictive accuracy of the AI structure. For example, the input parameters may be set according to the measured network data, failure modes, modulation table in use, and so forth as described above, and the AI structure may then be used to predict the resulting network performance metric. More specifically, the various intermediate functions may be calculated according to the input parameters, and the outputs (the predicted network performance metric in this case) may be calculated according to the results of the intermediate functions. Usually, the predicted network performance metric will differ from that measured. The intermediate functions may be adjusted or varied, and the calculations repeated to obtain an updated prediction of the network performance metric. The adjustable values of the intermediate functions may then be varied at random or in a pattern or according to a more purposeful method, to bring the predicted output more closely in agreement with the measured network performance metric. Successive predictions may be compared, to determine if the prediction accuracy has been improved by the value changes and to guide future value adjustments. The above process may be repeated for, preferably, a wide range of network configurations, modulation tables, and fault types observed, thereby gradually improving the accuracy of the predictions and broadening the range of conditions under which the predictions are accurate. The adjustment of values may be performed on each recorded case sequentially, or on groups or "batches" of similar scenarios with averaged input parameters, or otherwise. However the training is performed, the AI structure is preferably then tested using new data that the AI structure has never before seen.

When the AI structure has been adjusted so that it produces sufficiently accurate predictions of network performance, the AI structure can then be passed to base stations or core networks (preferably with the intermediate function values frozen) so that the network can predict the network performance according to various choices of the modulation table, and thereby select which table to use. Alternatively, the AI computer or another system may prepare a predictive algorithm based on the AI structure. For example, the AI structure may be simplified by "pruning" any input parameters or intermediate functions that exhibit little or no correlation between the modulation table and the predicted performance. Based on the AI structure, the algorithm may be an analytic function, a computer code, a tabular or matrix array, or other means for deriving a network performance prediction from the input parameters. For even simpler implementation, the algorithm may be configured to automatically monitor network conditions including faults, predict performance metrics according to each available modulation table, determine which table is expected to provide the best performance metric, and signal the network that the selected modulation table could provide improved performance. The network could then switch to the indicated modulation table without having to perform the analysis explicitly.

As a further alternative, the AI structure may be configured to assist network operators in adjusting the individual levels of a modulation table, such as adjusting one or more amplitude levels, to mitigate adjacent-amplitude faults for example. To do so, the AI structure may include, as inputs, values corresponding to the amplitude levels of a modulation table, and may vary one or more of those amplitude levels to predict the performance versus the amplitude level setting. This process may be repeated by varying each amplitude level in the modulation table, and may continue in an iterative cycle until optimal or near-optimal settings of the amplitude levels have been determined. The phase levels may be adjusted in the same way.

As a further alternative, the AI structure can be used to predict network performance according to a wide range of operating conditions other than modulation tables. For example, AI structures (or algorithms derived from them) may assist network operators in resolving problems and optimizing operations under conflicting demands. The AI structure or algorithm may assist the network in determining which frequencies and bandwidths to assign to various user nodes, what power levels and beam configurations to employ while avoiding interfering with other user nodes or other networks, how much bandwidth and other resources to dedicate exclusively to individual users (such as dedicated "SR opportunities" which are pre-assigned times at which certain user nodes may exclusively transmit an SR scheduling request message), how to allocate resources among a multitude of user nodes having a range of priorities and message sizes in both uplink and downlink, and a maze of other decisions regarding the network operations in fast-paced massively-parallel 5G and 6G networks. No human could handle the task, nor most computers, due to the demanding cadence and complexity. However, AI-developed algorithms, as taught herein, based on actual network data and trained with a sufficiently wide range of conditions, are well-suited to this type of problem and may enable network operators to operate future networks with greater efficiency than achievable otherwise. Artisans may develop such network-based AI structures and/or their derived algorithms after reading the matter and examples presented herein.

Turning now to the figures, FIG. 1 is a schematic of a modulation table according to prior art. The modulation table is presented graphically, with amplitude modulation levels (A1-A4) plotted along the vertical axis and phase modulation levels (P1-P4) along the horizontal axis, and each distinct modulation state, specified by one of the amplitude levels and one of the phase levels respectively, is shown as a "+" sign 101. In the depicted modulation table, there are four amplitude levels and four phase levels, thereby defining sixteen distinct modulation states. All of the modulation states are allowed or valid in this case, meaning that they can all be used for modulating symbols in a message. In addition, the amplitude levels A1-A4 are spaced apart uniformly by an amplitude spacing 104, and the phase levels P1-P4 are spaced apart uniformly by a phase spacing 103. In a particular case, the phase levels P1-P4 may be −135, −45, +45, and +135 degrees, which are equally spaced at 90 degrees apart. Likewise the amplitude levels A1-A4 may correspond to 0.4, 0.6, 0.8, and 1.0 times a maximum permitted amplitude, for example, and are also evenly or uniformly spaced apart. The depicted example corresponds to 16QAM, which is a "square-symmetrical" modulation table in that the number of phase levels equals the number of amplitude levels, the phase and amplitude levels are uniformly spaced, and all 16 distinct modulation states are valid. In addition, the number of amplitude levels is a power of 2, as is the number of phase levels, the number of total states, and the number of valid states in the modulation table.

Figure 2:
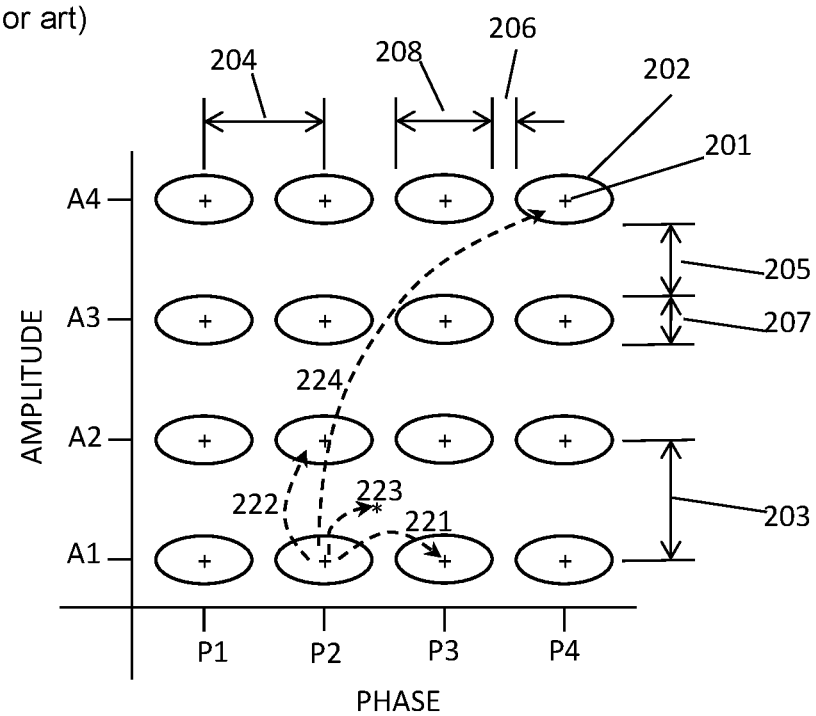
FIG. 2 is a schematic showing a square-symmetric modulation table including noise contours and certain fault conditions, according to prior art.

FIG. 2 shows a similar prior-art modulation table with four amplitude levels A1-A4 and four phase levels P1-P4, with each modulation state 201 marked with a "+" symbol. The amplitude spacing between amplitude levels is 203 and the phase spacing between phase levels is 204. Also shown, as an oval 202, is a contour of the SNR (signal to noise ratio) in the amplitude direction and the phase direction of the received signals for each modulation state. A noise-free signal would correspond to a point at the "+" sign 201 only, but in general the received signals are distorted by electronic noise in the transmitter and receiver, attenuation of the signal in propagation, variations in the gain or time-base or other parameter of the transmitter, the transmitter antenna, the receiver, the receiver antenna, and other random or pseudo-random variations, all of which will be included comprehensively as "noise" herein. In addition, occasional external "interference" such as signals from other transmitters can appear, further degrading the message quality when it occurs.

Also shown is the phase width 208 and amplitude width 207 of the noise contour 202, indicating the phase noise and the amplitude noise respectively. Noise fluctuations and interference can cause excursions outside the plotted noise contour 202, in which case the receiver would likely interpret the modulation state 201 incorrectly, causing a message fault. Also shown is a "gap" between the noise contours 202 of adjacent states 201, such as an amplitude noise gap 205 and a phase noise gap 206. The amplitude gap 205 is a symbolic representation of the amplitude noise margin, which is a measure of how much the amplitude noise may increase without causing the adjacent amplitude levels to overlap, and likewise the phase gap 206 is a graphical indication of the phase margin, in this graphical schematic. Mathematically, the amplitude noise gap between two adjacent amplitude levels is equal to the separation between those two levels minus the average of the noise widths of those two adjacent amplitude levels, and likewise for phase noise gaps. As long as the received signals remain within the indicated widths 207-208, the receiver is likely to detect and demodulate each symbol in the message correctly, without fault. However, if the noise were to increase in either the amplitude or phase directions, such that the adjacent noise distributions 202 begin to overlap, then the likelihood of a message fault is increased. A fault occurs whenever a received symbol is interpreted (demodulated) as a different value than transmitted. The receiving entity can generally determine that a fault has occurred by calculating an error-check code, such as a CRC or other error-check code, based on the as-received symbols of the message, and then comparing that value to a corresponding code embedded in the message. A disagreement between the calculated value and the message code indicates that at least one symbol of the message was altered.

Also indicated in the figure are four types of faults by dashed arrows. The arrow labeled 221 is an "adjacent-phase" fault in which noise outside the normal phase width 208 caused a phase shift in a symbol. The faulted symbol was originally modulated in the A1-P2 state (that is, the amplitude level of the modulation was the A1 level and the phase was P2). The phase noise distorted the symbol so that it appeared to have the A1-P3 modulation instead. Since those two modulation states are adjacent in the modulation table, the fault is termed an "adjacent-phase" fault. (Adjacent-phase faults also include faults interchanging the P1 and P4 phase levels, since phase is a cyclic parameter.) An adjacent-amplitude fault is indicated by arrow 222, in which amplitude noise caused an A1-P2 modulated symbol to acquire extra apparent amplitude, bringing it into the adjacent state of A2-P2. Dashed arrow number 223, terminating in a small star, is an ambiguity-state fault in which the A1-P2 state was distorted by noise into a region of the modulation table that is not a legal modulation for any of the modulation states. Dashed arrow number 224 shows a non-adjacent fault in which a larger distortion, such as external interference, changed the A1-P2 modulated symbol to look like a distant modulation state of A4-P4. Non-adjacent faults also include distortions that drive the symbol entirely off the table. Each of these faults would cause the message to fail an error-check code, thereby revealing the message failure.

Figure 3:
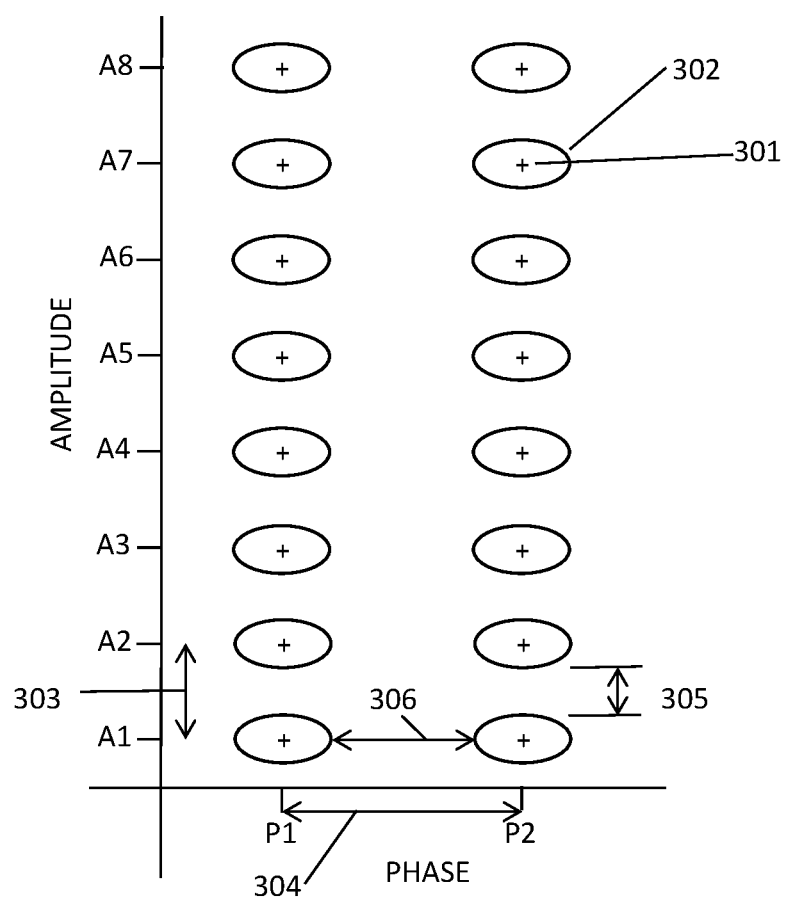
FIG. 3 is a schematic showing an exemplary embodiment of an asymmetric modulation table in which the number of phase levels is different from the number of amplitude levels, according to some embodiments.

FIG. 3 is a schematic of an exemplary embodiment of an asymmetrical modulation table according to present principles, in which the number of amplitude levels is different from the number of phase levels, according to some embodiments. The depicted modulation table has 8 amplitude levels A1-A8 and 2 phase levels P1 and P2, thereby providing 16 distinct modulation states. This is the same number of states as the 16QAM example of FIG. 1, but now distributed in an 8×2 configuration (that is, Namp×Nphase, or 8 amplitude levels×2 phase levels). The example thus depicts a modulation table in which the number of phase levels is different from the number of amplitude levels. In one embodiment, the amplitude levels A1-A8 correspond to 0.3, 0.4, 0.5, 0.6, 0.7, 0.8, 0.9, and 1.0 times a maximum permitted amplitude, and thus in this case are equally spaced with a spacing 303 of 0.1 times the maximum amplitude. The two phase levels P1 and P2 correspond to −90 and +90 degrees, which are also equally spaced 304 in the sense that the phase levels are separated by 180 degrees. Each distinct modulation state is indicated by a "+" 301 surrounded by a noise contour 302. Also shown is the amplitude gap 305 and the phase gap 306 separating the adjacent noise distribution contours 302. The amplitude levels are more closely spaced here than for the example of FIG. 2, and hence the amplitude gap 305 is relatively smaller (other things being equal). The phase levels are more widely spaced than in FIG. 2 since there are now only two phase levels, and hence the phase gap 306 is relatively larger.

An advantage of the modulation table of FIG. 3 can be improved phase noise immunity. If a network, using a symmetrical modulation table such as that of FIG. 2, detects more phase errors than amplitude errors, the network may wish to change to the asymmetrical table of FIG. 3 in order to increase the phase gap and hence reduce the incidence of phase modulation errors. Such a strategy may be especially valuable at high frequencies, where phase noise usually causes more faults than amplitude noise. Thus the asymmetrical modulation table of FIG. 3 can provide improved phase margin, with only minimal loss of amplitude resolution, and hence a net reduction in message failure rates, according to some embodiments.

Figure 4:
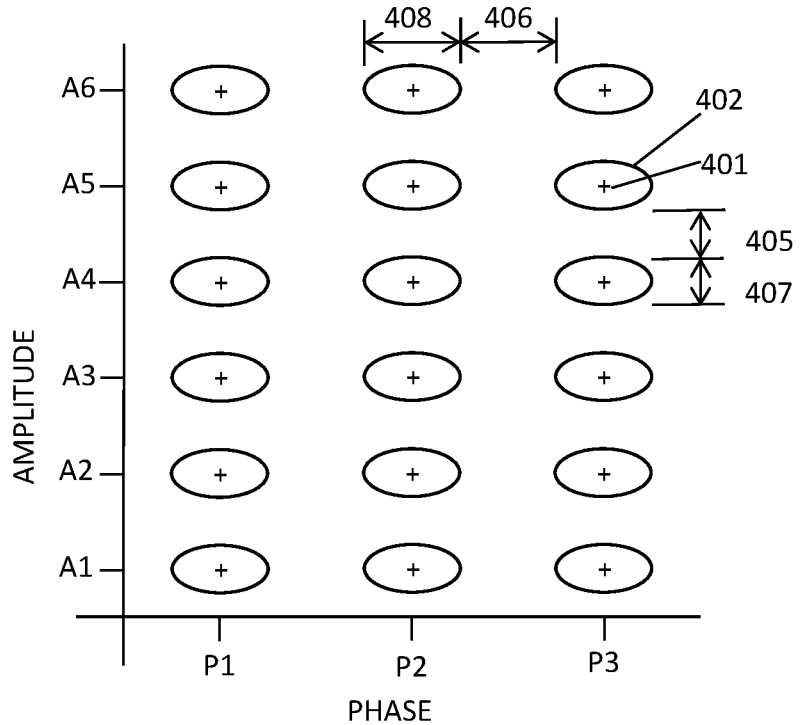
FIG. 4 is a schematic showing an exemplary embodiment of an asymmetric modulation table in which the number of amplitude levels is an integer other than a power of two, according to some embodiments.

FIG. 4 is a schematic of an exemplary embodiment of an asymmetrical modulation table in which the numbers of amplitude levels or phase levels is/are not equal to a power of 2, according to some embodiments. In the depicted table, there are three phase levels and six amplitude levels; hence, Nstates=Namp×Nphase=6×3=18. Neither Namp nor Nphase is an integer power of 2. The amplitude levels A1-A6 in this example may be uniformly spaced at 0.25, 0.4, 0.55, 0.7, 0.85, and 1.0 times the permitted maximum amplitude, respectively. The phase levels P1-P3 may also be uniformly spaced at −120, zero, and +120 degrees relative to a carrier (or alternatively at −60, +60, and +180 degrees, if desired, to avoid using the carrier phase as a modulation level). As before, the valid states 401 are indicated by a "+" and the noise distribution by an oval 402.

An advantage of the depicted modulation table may be, in some implementations, that the amplitude noise width 405 is equal to the amplitude gap 407, and the phase noise width 408 equals the phase gap 406. Thus, in this case, the ratio of the noise width divided by the gap, is the same for both amplitude and phase modulation. In some cases, lower message failure rates may be obtained by use of a modulation table that provides similar noise margins, or similar gap-to-width ratios, for the amplitude and phase levels, as indicated here. In another embodiment, a ratio may be determined for non-uniform level spacings, in which the ratio equals the gap between a pair of adjacent amplitude noise contours divided by the average of the two adjacent noise widths. The levels may be configured to make this ratio equal for all the amplitude levels, and likewise for the phase levels. With the gaps thus adjusted according to the noise widths, the overall fault rate can be reduced, according to some embodiments.

Another advantage of the modulation table of FIG. 4 may be that the 18 states, being 2 more than the usual 16QAM states, can provide additional communication flexibility. For example, all 18 states may be used for modulating symbols of wireless messages, resulting in faster transmission than a standard 16QAM table as shown in FIG. 1. Alternatively, the "extra" states beyond the standard 16 could indicate a change in the modulation table to be used for demodulating the rest of the message, one of the extra states indicting a switch to an alternative table, and the other extra state indicating a switch back to the original table. Alternatively, 16 of the states may be used for modulating symbols of messages corresponding to the "regular" 16 modulation states of a symmetric modulation table such as 16QAM, and the "extra" two states may be put to service carrying other information, such as a parity or error-checking code, or a QoS (quality of service) requirement, or an emergency indicator, or a sequence value, or other flag or parameter beyond the actual message data. In one embodiment, 16 of the modulation states may be "regular" states, meaning that they are used for modulation of the message symbols, while the two "extra" states are used for some other purpose, other than modulating the symbols of the message. The 16 regular states may be assigned to correspond to a prior-art modulation table such as the 16 states of 16QAM. The 17th state may be used to indicate the beginning of a message, and the 18th state may be used to indicate the ending of the message. Use of the extra modulation states for indicating something about the message other than the actual data of the message, such as the beginning and ending of the message, may simplify the detection and decoding of certain messages such as unscheduled messages on, for example, the random access channel. The extra symbols, used in this way, may avoid time-consuming message requirements such as multi-symbol preamble requirements and the like, by unambiguously showing the starting and ending of the message content. The message content consists of all the symbols between the two "extra" symbols. The extra symbols are then recognizable as such since they are modulated according to the 17th and 18th states. Artisans may find additional valuable uses for symbols modulated according to the extra states provided by an asymmetric modulation table in view of the teaching disclosed herein.

Figure 5:
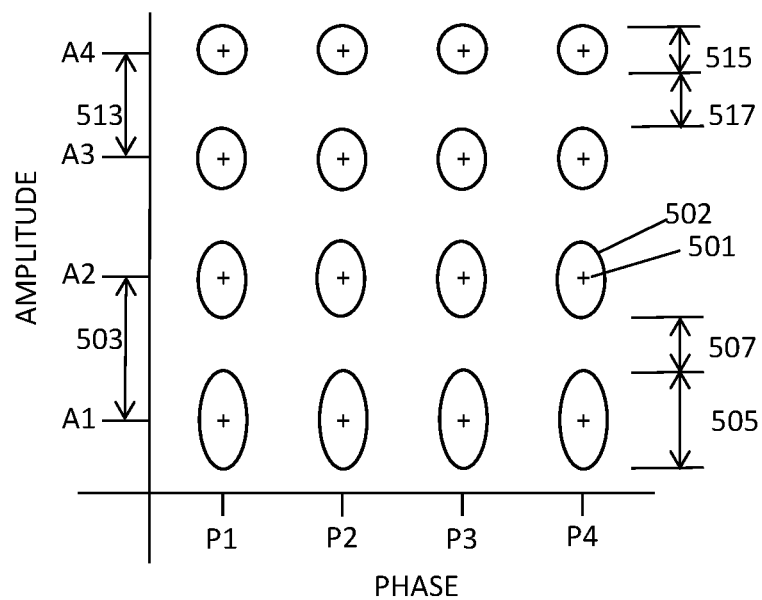
FIG. 5 is a schematic showing an exemplary embodiment of an asymmetric modulation table with non-uniform amplitude level spacing, according to some embodiments.

FIG. 5 is a schematic of an exemplary embodiment of an asymmetrical modulation table with non-uniformly spaced amplitude levels, according to some embodiments. The modulation states are indicated by a "+" 501 and the oval 502 indicates a contour of the SNR, signal to noise ratio. The amount of amplitude noise is relatively constant throughout the table, but the signal strength is much lower at the low-amplitude end of the table (A1) than at the high-amplitude end (A4), and therefore the contours 502 show a steady decrease in width, in the amplitude direction, as the signal amplitude is increased. In this example of non-uniformly spaced amplitude levels, the amplitude levels A1-A4 may correspond to 0.3, 0.7, 0.9, and 1.0 times a permitted transmission amplitude. Thus the amplitude levels are spaced apart by a relatively larger space 503 at the low amplitude end of the table, and by a relatively smaller space 513 at the high amplitude end of the table. The phase levels P1-P4 are uniformly spaced at −135, −45, +45, and +135 degrees relative to a carrier. The amplitude noise width at the A1 level is shown as 505, and the gap between the noise contours of the A1 and A2 levels is shown as 507. Likewise the much smaller amplitude noise width of the A4 level is shown as 515 and the gap between the A3 and A4 levels is shown as 517. As can be seen in the figure, the A1-A2 gap 507 is equal to, or at least similar to, the A3-A4 gap 517, even though the amplitude noise widths 505 and 515 are quite different. For example, the amplitude noise gaps 507-517 may be made equal to within 1%, 5%, 10%, 25%, or 50%.

An advantage of spacing the amplitude levels A1-A4 non-uniformly may be that the rate of message failures may be reduced, according to some embodiments. For example, one or more amplitude level may be adjusted to mitigate a low SNR at low amplitude levels. As shown, the amplitude level spacing may be adjusted according to the measured noise widths of the various amplitude levels. The adjusted amplitude levels may thereby provide similar gaps, or other measure of noise margin, between amplitude levels throughout the table, which may result in fewer faults. Alternatively, the amplitude levels may be arranged to provide similar values of the gap-to-width ratio, or other measure of reliability depending on what produces the best network operation. In a practical network, the amplitude levels may be adjusted empirically to minimize the number of message faults due to amplitude modulation misidentification, for example. Each user node may employ its own modulation table, with an adjusted set of amplitude levels, different from those of the other user nodes, to combat location-dependent noise and device-dependent noise, for example. In addition, the base station may use yet another, different set of amplitude levels for downlink messages to each of the user nodes, for example to provide optimal reception to each user node by compensating the particular attenuation or noise factors experienced by each of the user nodes.

Figure 6:
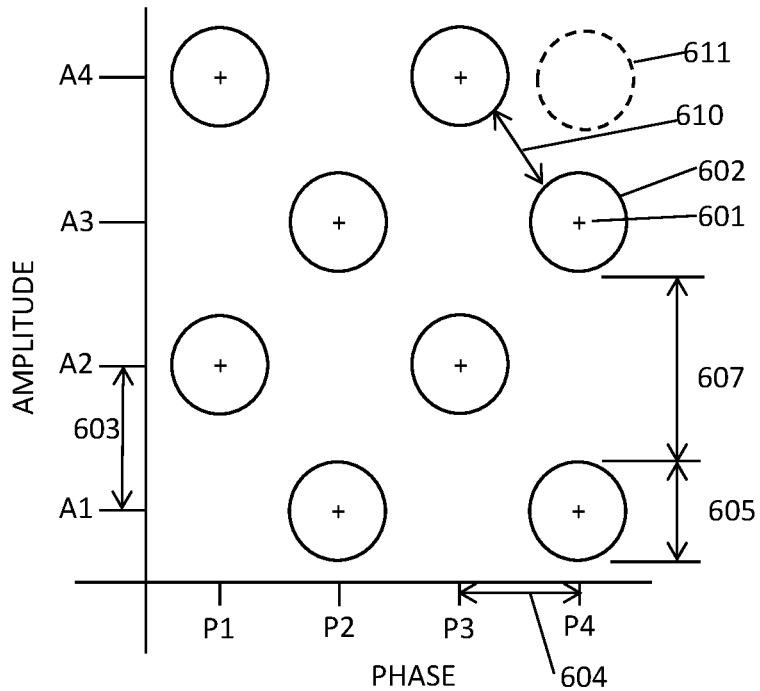
FIG. 6 is a schematic showing an exemplary embodiment of an asymmetric modulation table in which some of the states are invalid, according to some embodiments.

FIG. 6 is a schematic of an exemplary embodiment of an asymmetric modulation table that includes invalid states, according to some embodiments. As mentioned, each modulation state in the table is defined by one of the amplitude levels A1-A4 and one of the phase levels P1-P4, respectively. Valid states are indicated by a "+" 601 and invalid states are left blank, except for one invalid state 611 which is indicated by a dashed circle. The noise distribution is indicated by a circle 602 in this case, of width 605, indicating that the noise is similar in the amplitude and phase directions. The four amplitude levels A1-A4 are separated by a uniform separation 603, and the four phase levels P1-P4 are also uniformly spaced by spacing 604. As can be seen, the valid and invalid states are alternated or interleaved in a checkerboard-like fashion, so that each valid state is surrounded on four sides by invalid states, and each invalid state is surrounded on four sides by valid states (except for the edges). Stated differently, each valid state is adjacent, or next to, four of the invalid states and each invalid state is adjacent to four of the valid states, the adjacency being both row-wise and column-wise. However, this only applies to "interior" states, which are states not in the first and last rows and columns of the table which represent the edges of the table. Each valid state may then be surrounded on four sides by either invalid states or by the ends of the table, and each invalid state may be surrounded on four sides by either valid states or by the ends of the table.

An advantage of providing both invalid and valid states in the modulation table, in this case an equal number of valid and invalid states, may be that the noise margin of the remaining valid states may be increased thereby, in both amplitude and phase directions. For example, the amplitude gap between the noise distributions of valid states, indicated as 607, is much larger than it would have been if all the states were valid. The phase gaps are similarly increased relative to a fully-occupied table. The incidence of message failures due to adjacent-amplitude and adjacent-phase faults may be reduced due to the increased gaps between neighboring valid states. The nearest valid neighbor to each valid state is diagonally positioned, hence both amplitude and phase would have to be misidentified to cause a "diagonal fault" spanning the diagonal gap 610. For these reasons, a network operator may select such an asymmetric modulation table to reduce message failure rates. The data rate is reduced slightly since each symbol can then carry one less bit of information when only half of the possible modulation states are valid. For example, a 256QAM table encodes 8 bits per symbol, and if half the states are made invalid, the modified table then encodes just 7 bits per symbol, resulting in a 15% reduction in data rate. However, the network operator may compensate for that reduction by increasing the transmission rate (using higher frequencies or higher bandwidths for example). Such higher frequencies or bandwidths may not be feasible with prior-art symmetric modulation tables in which all the states are valid, due to their smaller noise margins. But by switching to the depicted asymmetric table, with its larger separation between valid states, the network operator may be able to obtain higher transmission rates without significantly increasing the message failure rate. In other words, the network may obtain increased noise immunity using an asymmetric modulation table in which alternate states are invalid, and as a consequence may increase the throughput using faster transmission while maintaining lower failure rates, thereby obtaining a net win in overall performance, according to some embodiments.

Figure 7:
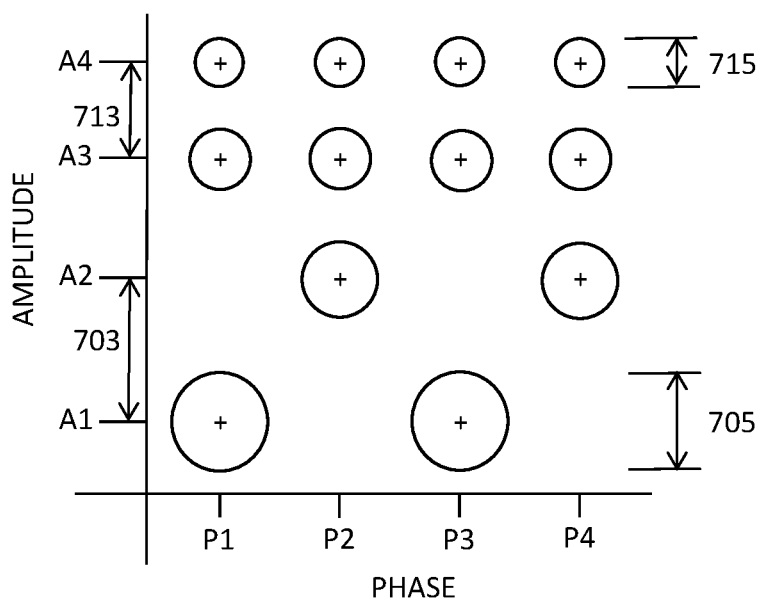
FIG. 7 is a schematic showing an exemplary embodiment of an asymmetric modulation table having both non-uniform amplitude levels and invalid states, according to some embodiments.

FIG. 7 is a schematic of an exemplary embodiment of an asymmetric modulation table with non-uniform level spacing and with strategically selected invalid states, according to some embodiments. Amplitude levels A1-A4 are non-uniformly spaced, starting with spacing 703 at the low-amplitude end of the table, and decreasing to 713 at the high-amplitude end of the table. The amplitude noise width ranges from a large value 705 at the low-amplitude end of the table, to a much smaller value 715 at the high-amplitude end. The non-uniform spacing of the amplitude levels is intended to compensate for a reduced noise margin for the lower amplitude signals due to the larger noise width (or the reduced SNR) at low amplitudes. However, in this case the phase noise is also large at low amplitudes, which may be a result of the increased difficulty for the receiving electronics to resolve the phase of a signal at low amplitude, since the SNR is lower than for a signal with a higher amplitude. The phase noise problem is not helped by making the amplitude level spacing non-uniform. One possibility is to declare half of the states to be invalid, as in FIG. 6, but that would eliminate several valuable transmission states in the high-amplitude end of the table. That may not be desirable because the best signal transmission is obtained at the high amplitude end of the table, due to the higher SNR there. A better way to mitigate the phase noise degradation at low amplitudes may be to make certain states invalid, preferably in an alternating manner, at the low-amplitude end of the table only. In the depicted case, alternate states are made invalid in the amplitude levels A1 and A2 only, whereas all the high-amplitude states at levels A3 and A4 remain valid. By strategically declaring certain modulation states, characterized by low signal or high noise, to be invalid states, while preserving the remaining states as valid, the network can improve reliability due to increased noise margin among low-amplitude states, with only slight loss of transmission rate due to the small number of invalidated states, according to some embodiments.

An advantage of making alternate states invalid in the region of the modulation table where the noise margin is poor, but keeping all the states valid in other areas of the table where the noise margin is satisfactory, may be to reduce message failures with minimal reduction in transmission rate. For example, the message rate using the modulation table of FIG. 7 corresponds to 12 valid states, compared with 16 valid states in FIG. 5, a reduction of only 25% in the number of available modulation states or a fraction of a bit per symbol in information density. This may be compensated by the time saved in avoiding retransmissions of faulted messages, and further compensated by possibly increasing the frequency or bandwidth or other parameter to optimize the throughput overall.

Asymmetric modulation tables may be designated by names indicating features of the modulation table. For example, a modulation table with Namp different from Nphase may by designated by listing the numbers of amplitude and phase levels separated by "x", such as 8×2QAM for the table of FIG. 3 with Namp=8 and Nphase=2, or 6×3QAM for the table of FIG. 4 with Namp=6 and Nphase=3. A table with non-uniform spacing between levels may be designated by "n" between the amplitude and phase level numbers, such as 4n4QAM for the table of FIG. 5. A table with invalid states may be designated by an "i" after the numbers, such as 16iQAM for the table of FIG. 8. If the table has invalid states as well as a non-uniform level spacing, such as that of FIG. 7, the table may be designated as 4n4iQAM. A table with a variable level, such as that of FIG. 12 below, may be designated with a "v" as in 4v4QAM. With such a compact but versatile informative designation, various types of asymmetric modulation tables may be conveniently categorized.

Figure 8:
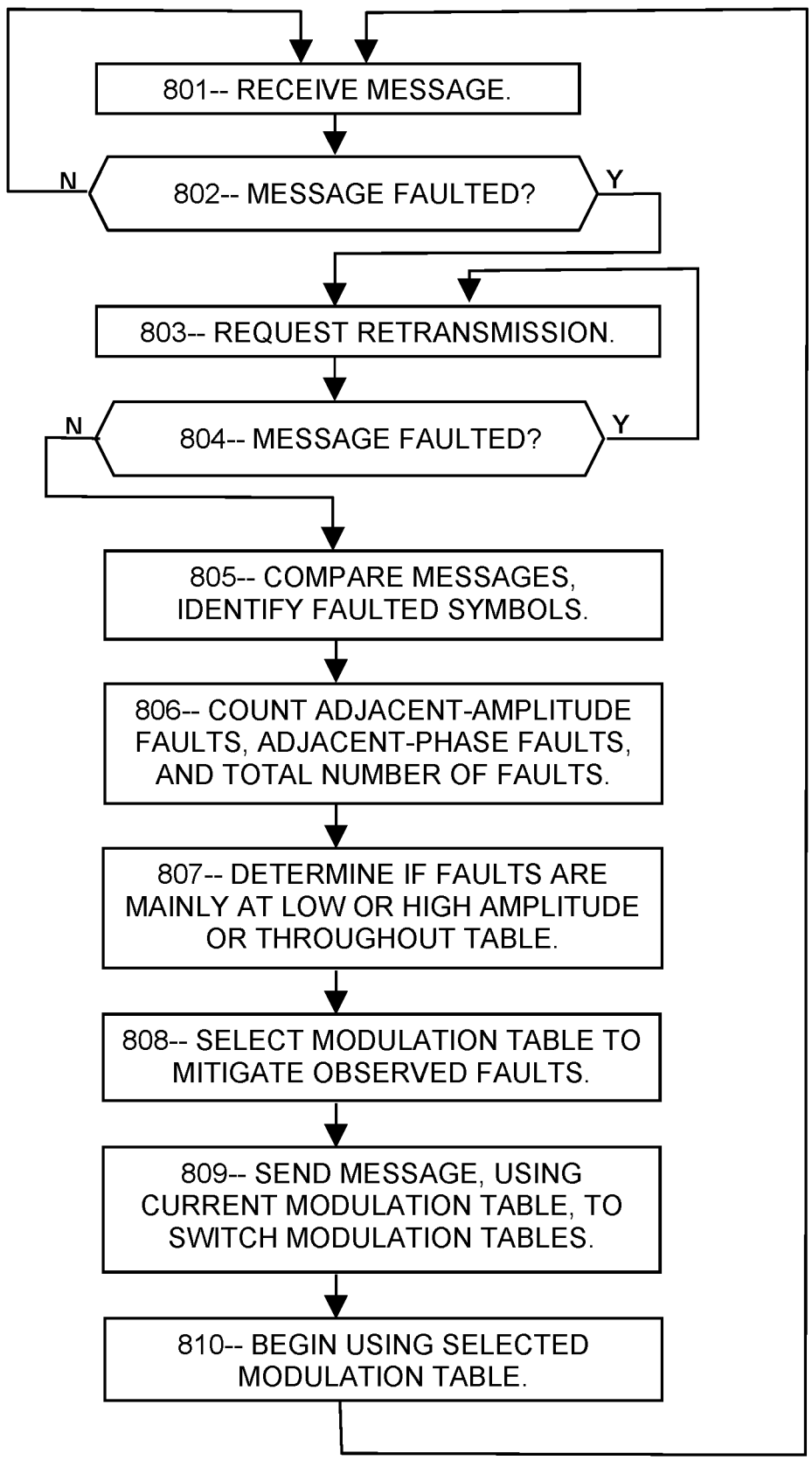
FIG. 8 is a flowchart showing an exemplary embodiment of a method for analyzing faulted messages, according to some embodiments.

FIG. 8 is a flowchart showing an exemplary embodiment of a method for selecting a modulation table based on the observed fault types, according to some embodiments. An intent of this method is to determine message failure modes from the faulted messages, and then select which modulation table would likely reduce those failure modes. In this example, ambiguous-state faults, which fall outside the normal noise contours of the valid states (such as arrow 223 in FIG. 2), are counted in the total number of nonadjacent faults. Initially at 801, a node (base station or user node) receives a wireless message and checks at 802 whether the message is faulted. For example, faults may be detected by comparing the as-received message with an embedded error-check code, or by detecting at least one illegal modulation such as a modulation beyond the edges of the table, in the message. If the message was unfaulted, that is, successfully received and matching the error-check code, then flow returns to 801 to receive another message. If the message is faulted, then at 803 a retransmission is requested using, for example, the HARQ (hybrid automatic repeat request) procedure if implemented, or other retransmission message request as appropriate. If the retransmitted message is successfully received at 804, then at 805 the node compares the faulted and successful messages, symbol-by-symbol, to determine which symbols were altered and how they were altered. At 806, a tally of adjacent-amplitude faults and a tally of adjacent-phase faults are counted, as well as a total number of faults in a period of time. An adjacent-amplitude fault is a received symbol that differs from the corresponding symbol in the unfaulted message by one amplitude modulation level, and an adjacent-phase fault is a symbol that differs from the correct symbol by one phase modulation level.

At 807, the node determines the distribution of faults occurring in various regions of the modulation table. For example, fault totals may be tallied for each valid state of the table, and separate totals may be tallied for faults occurring in the low-amplitude and high-amplitude portions of the table, among other patterns. At 808, the node selects a particular modulation table that can reduce the incidence of faults that have been detected, and at 809 the node sends a message (to the base station if a user node, or to the user nodes if a base station) recommending that the current modulation table be changed to the selected one. That message is sent using the current modulation table, of course, since the change has not yet been implemented. There may be other messages involved, such as a beacon message or RRC (radio resource control) message or the like, transmitted by the base station, indicating a change in modulation tables. Thereafter, at 810, the node begins using the selected modulation table for future messages such as data messages transmitted on a PUSCH (physical uplink shared channel) or other channel.

An advantage of performing such a fault analysis on the as-received messages (by comparing the corresponding symbols of faulted and unfaulted messages) may be that the fault information may reveal that a more effective modulation table is available, and that switching to that table may reduce future faults of the types most often encountered. Thus, the depicted method may be an efficient way to determine objectively which modulation table is able to provide improved network performance, according to some embodiments.

FIG. 9 is a schematic showing an exemplary embodiment of two wireless messages, according to some embodiments. One of the messages 901 includes faults and the other 902 is without fault, as labeled. Each message is a series of symbols modulated according to an amplitude level and a phase level, indicated for example as A1-P3 for the amplitude modulation level A1 and the phase modulation level P3, referring to a particular modulation table such as that of FIG. 5. Faults can be detected by comparing the modulation state of the corresponding symbols for the two messages and noting which symbols are different. In the figure, symbols that differ between the two messages 901-902 are shown bolded and connected by a dashed line. The first three symbols of the two messages 901-902 are identical, but the fourth symbol is different. This is an example of an adjacent-amplitude fault 903 because the disagreement between the two corresponding symbols is a single amplitude level, specifically A4 in the unfaulted message 902 has been changed to A3 in the faulted message 901, a change of one amplitude level. Also shown is an adjacent-phase fault 904 with the phase changed from P1 to P2, a change of one phase level. A non-adjacent fault 905 is also shown, in which the amplitude modulation level was changed from A4 to A1, a change of more than one amplitude level. It may be noted that a change in phase modulation from P4 to P1 would count as an adjacent-phase fault, because the phase dimension is circular.

In a wireless network, a base station or a core network may be configured to detect faulted and unfaulted messages according to agreement with an embedded CRC code or equivalent error-check code, and then may compare the corresponding symbols of the two messages to locate the faulted symbols and determine, from the size of the amplitude or phase modulation disagreement between the two messages, whether the faults are adjacent-amplitude or adjacent-phase or non-adjacent type faults. Since noise often causes near-neighbor, or adjacent type faults, whereas non-adjacent faults may indicate larger but sporadic interference or the like, different mitigations may be needed in those cases.

FIG. 10 is a schematic showing an exemplary relationship between fault types detected and options for mitigation of those faults. To mitigate adjacent-amplitude faults, the modulation table may be changed to one with fewer amplitude levels, and therefore a wider spacing between amplitude levels, thereby increasing the noise margin for amplitude distortion noise. To mitigate adjacent-phase faults, a different modulation table with fewer, and more widely spaced, phase levels may be advantageous. If both adjacent-amplitude and adjacent-phase faults are detected, the modulation table may be altered by making alternate states invalid for modulation in a portion of the modulation table or in the entire modulation table, depending on whether the problem is localized to a portion of the modulation table or is seen roughly equally throughout the table. Making alternate states invalid thereby increases the amplitude and phase separation between the remaining valid state, resulting in increased noise margin and likely fewer faults.

If the faults are largely non-adjacent, then they may be caused by occasional external interference, in which case it may be beneficial to make the messages chronologically shorter to sidestep the interference if possible. To do so, the modulation table may be changed to a larger one with more amplitude and phase levels, thereby encoding more bits per symbol, and therefore shortening the duration of each message proportionally. Although the separation between amplitude and phase levels would be made smaller by that change, this could result in only insignificantly increased failures as long as the remaining noise margin is still sufficient. The network may have to test this by running the larger modulation table and checking whether the total failure rate increased or decreased.

In some cases, the adjacent-type faults may be concentrated in one portion of the modulation table, such as the lowest amplitude levels where the SNR may not be as large as for the high-amplitude levels. In that case, the amplitude levels in the low-amplitude portion of the table may be spread farther apart, with possibly the high-amplitude levels being pushed closer together if the total range of amplitude modulation remains constant. Likewise, if the faults are mainly in the high-amplitude levels, those levels may be spread farther apart, at the expense of the low-amplitude level spacing. Whether this change reduces net failures depends in a complex way on the noise properties, and therefore the network would likely have to try such a modulation level adjustment to determine whether it is successful. If so, the levels may be adjusted farther in the same direction to determine whether the improvement is increased. If, however, the adjustment does not enhance reliability, or makes it worse, the network can switch back to the original modulation table.

In some cases, adjacent type faults may be detected throughout the table, and for amplitude and phase faults equally. In that case, the network may change to a modulation table in which alternate states are made invalid, which greatly increases the noise margin of the remaining valid states in most cases. If, however, that does not resolve the problem, as a last resort the network may elect to increase the permitted transmission power of the user nodes that exhibit excessive faulting, or increase the downlink power to those user nodes, to enhance reception SNR and thus message reliability. Networks generally do not like to increase the permissible power levels due to potential interference with other networks as well as the increased power demands to which battery-operated user nodes may be sensitive.

Figure 11:
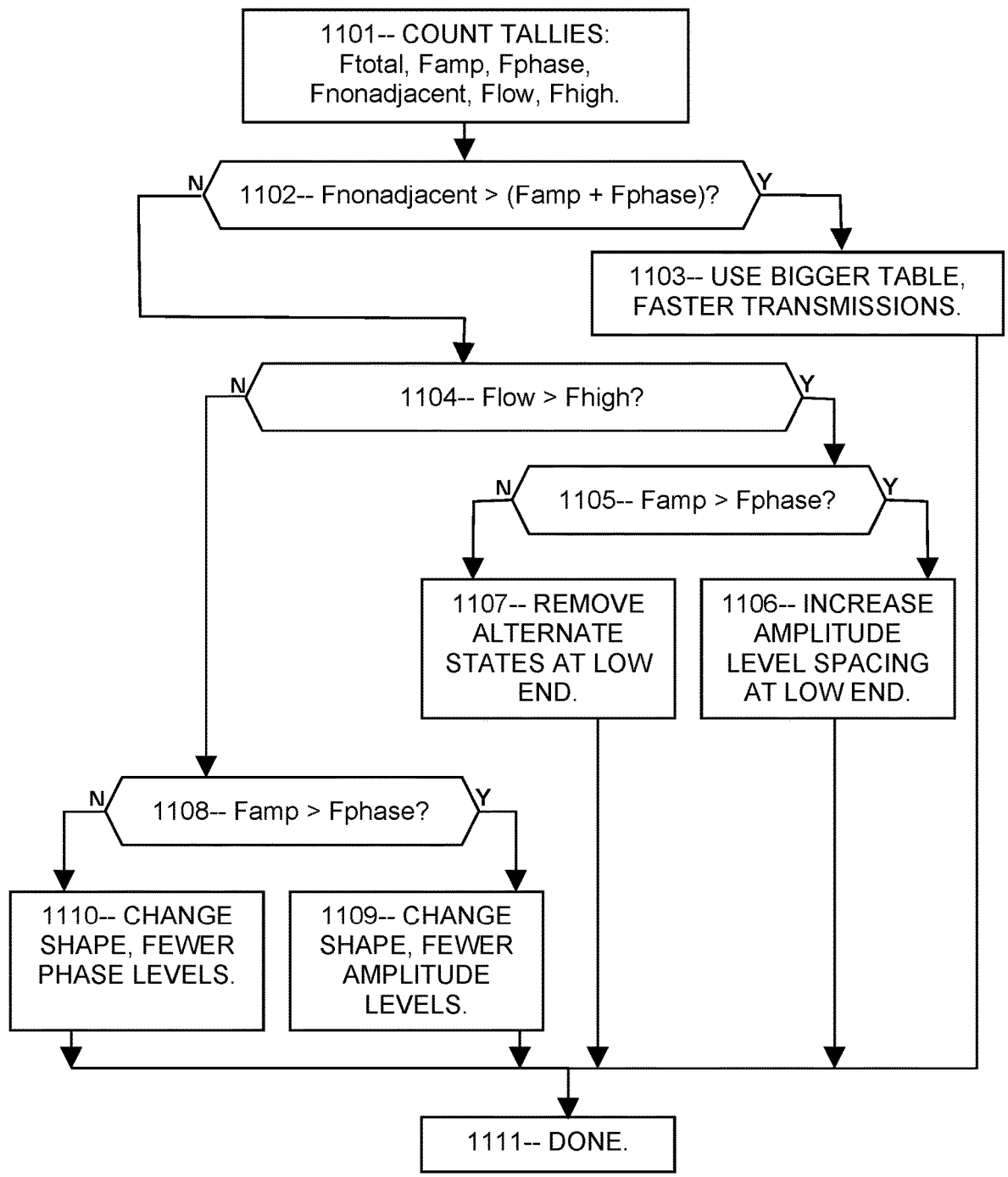
FIG. 11 is a flowchart showing an exemplary embodiment of a method for selecting a modulation table based on analysis of faulted messages, according to some embodiments.

FIG. 11 is a flowchart showing an exemplary embodiment of a method for selecting a particular modulation table based on detecting and analyzing message faults, according to some embodiments. The method of FIG. 11 may, for example, implement the "selecting" of item 808 in FIG. 8. At 1101, a node counts the number or rate of detections of various types of message faults, such as the faults described in FIG. 8. The node may accumulate tallies of observed fault types for a period of time, each tally indicating a number or incidence rate of each fault type. For example, the node could count the total number of faulted symbols Ftotal, the number of adjacent-amplitude faults Famp, the number of adjacent-phase faults Fphase, the number of faults involving symbols that are not adjacent in the modulation table Fnonadjacent, the number of faults occurring in the low-amplitude portion of the table Flow, and the number in the high-amplitude portion Fhigh. At 1102, the node may compare the number of adjacent to nonadjacent faults, specifically determining if Fnonadjacent is greater than the sum of the Famp plus Fphase. If most faults are indeed nonadjacent, then the node may conclude that the faults are due to occasional, large magnitude interference rather than random noise, since random noise usually causes adjacent modulation faults. Therefore, at 1103, the node may recommend using faster transmissions in an attempt to sidestep the interference, using for example a larger modulation table (with more bits per symbol and therefore fewer symbols per message and therefore a quicker message) as well as a higher frequency or bandwidth, among other steps to reduce the on-air time per message.

If, however, the adjacent faults exceed the nonadjacent faults at 1102, the node can then at 1104 determine whether the faults occurred mainly in the higher or lower amplitude portions of the table. If the faults usually occur in the low-amplitude portion, then at 905 the node may determine that the problem is the low signal strength in low-amplitude modulated symbols, and may then ask whether the faults are mainly adjacent-amplitude or adjacent-phase faults at 1105. If they are mainly adjacent-phase faults, the node may recommend removing alternate states at the low end of the table, as illustrated in FIG. 7, to provide greater phase margin as well as amplitude margin for low-amplitude signals. If, however, the faults are mainly adjacent-amplitude type faults in the low-amplitude portion, the node may suggest at 1106 that the amplitude levels be adjusted to provide greater spacing between amplitude levels at the low-amplitude end, and perhaps use a smaller spacing at the high-amplitude end of the table, to provide additional needed amplitude margin. For example, a particular amplitude level may be adjusted in a first direction (that is, its value may be increased or decreased) while the other amplitude levels are held constant, and the resulting change in a network performance metric, such as throughput or message failure rate, may be measured. Then, if the metric was improved (such as higher throughput or lower failure rate), the particular amplitude level may be adjusted in the same direction (increased or decreased) as before, and the network metric may be again measured. Alternatively, if the result of adjusting the particular amplitude level was to make the network metric worse, then the particular amplitude level may be re-adjusted in the opposite direction (that is, decreased if the initial variation was an increase, and vice-versa). In this way, by iteratively varying the particular amplitude level, or other amplitude levels, while monitoring the network performance, improved performance may be obtained.

Returning to 1104, if the number of faults is not concentrated in the low-amplitude portion of the table, then the node may determine at 1108 whether the faults are mainly adjacent-amplitude or adjacent-phase type faults. If they are mainly adjacent-phase faults, then at 1110 the node may suggest that a differently-shaped modulation table may be better, such as one with fewer phase levels, to provide greater phase margin. Likewise the node may determine, from the number of adjacent-amplitude faults, whether the number of amplitude levels should be increased, decreased, or remain unchanged relative to the current table. If, however, the faults are mainly adjacent-phase faults at 1108, then at 1109 the node may suggest a modulation table with fewer amplitude levels and greater amplitude gaps to improve the amplitude noise margin. The modulation table may be adjusted in this way until the adjacent-amplitude fault rate is approximately equal to the adjacent-phase fault rate, such as within 10% or 25% or 50% of each other. After making the determination and recommending a change of modulation table at 1103, 1106, 1107, 1109, or 1110, the node is done at 1111 until further faults are detected.

As an alternative, the node may find that the number of faults in the lower portion of the table roughly equals the number in the higher portion, and that most faults are adjacent-type faults, and that the number of adjacent-amplitude faults is roughly equal to the number of adjacent-phase faults. In that case, the node may suggest switching to a modulation table with the same number and spacing of amplitude levels as the current table, and the same number and spacing of phase levels as the current table, but with alternate states made invalid, in a checkerboard-like pattern. This may increase the noise margin between adjacent states in both the amplitude direction and the phase direction, at a cost of only one bit per symbol in information density. The increased noise margins may result in fewer faulted messages and fewer retransmissions, among other benefits, thereby compensating for the reduced number of bits per symbol. In addition, the increased phase margins can allow operation at a higher frequency or bandwidth or other parameter, further compensating the reduced number of modulation states.

Figure 12:
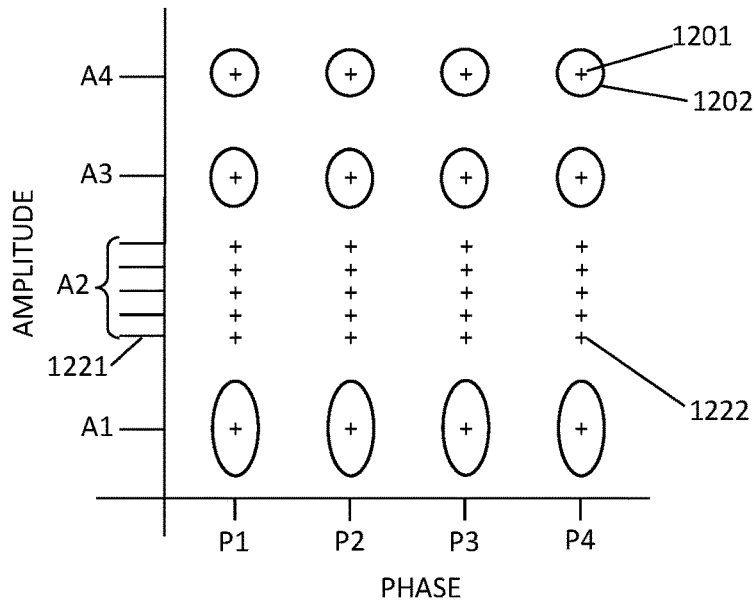
FIG. 12 is a schematic showing an exemplary embodiment of an asymmetric modulation table with an adjustable amplitude level, according to some embodiments.

FIG. 12 is a schematic showing an exemplary modulation table in which an amplitude level is adjustable, according to some embodiments. Modulation states 1201 are surrounded by noise contours 1202. The amplitude modulation levels are shown on the vertical axis and the phase levels on the horizontal axis. Several different settings 1221 of the second amplitude level A2 are shown, indicating how the A2 level may be adjusted to mitigate, for example, adjacent-amplitude faults in the low-amplitude portion of the table. The adjusted states corresponding to each adjusted level are shown as further "+" signs 1222.

A network may adjust the A2 level by varying the amplitude setting among the candidate settings shown 1221 and monitoring the resulting message failure rate, especially the adjacent-amplitude fault rate in the lower portion of the table. After testing several of the candidate settings 1221 in this way, the network can select whichever candidate setting 1221 provides the lowest failure rate, and can use that setting thereafter for improved message reliability.

Figure 13:
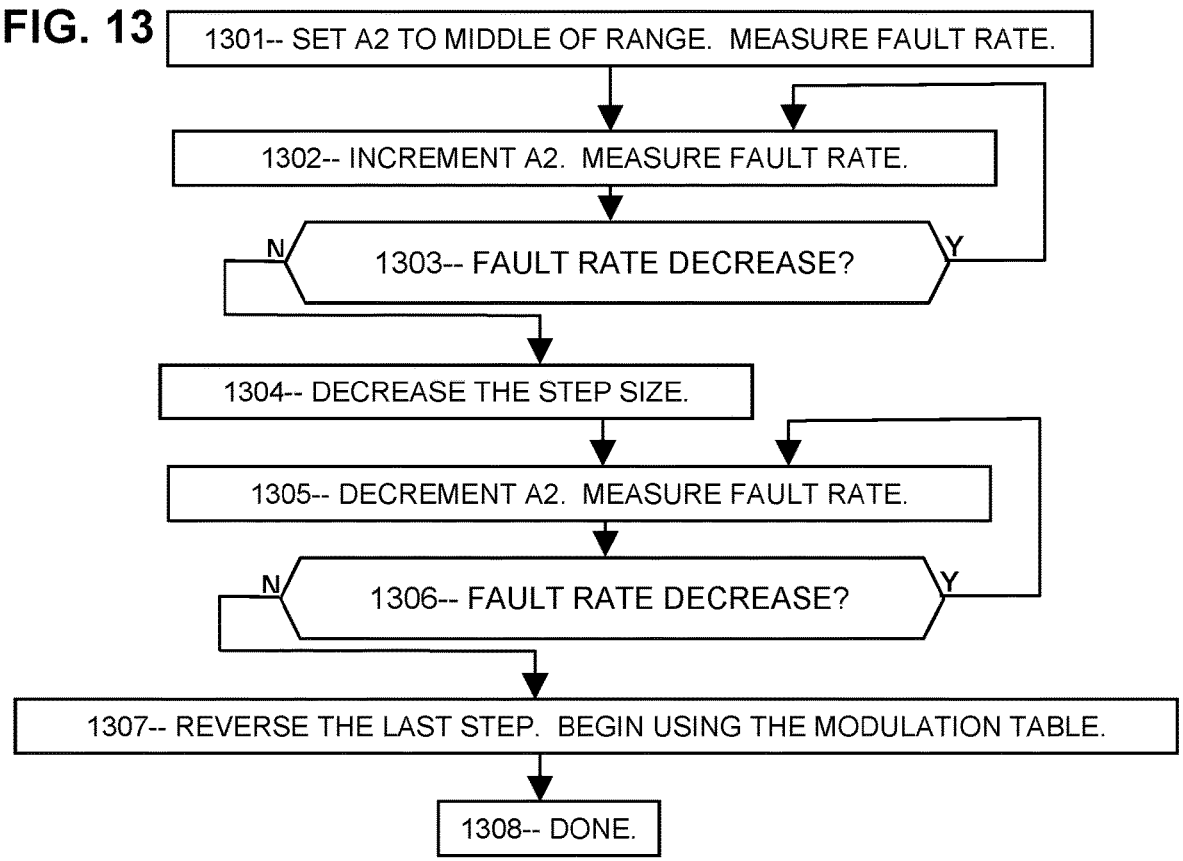
FIG. 13 is a flowchart showing an exemplary embodiment of a method for adjusting an adjustable level in a modulation table, according to some embodiments.

FIG. 13 is a flowchart showing an exemplary embodiment of a method for adjusting an amplitude level in a modulation chart, according to some embodiments. One intent of this method may be to adjust the value of one of the amplitude levels, such as the A2 level in FIG. 12, to minimize adjacent-amplitude faulting in a wireless network. At 1301, the A2 level is set to a midpoint of a predetermined range, or other starting value, and the fault rate, such as the adjacent-amplitude fault rate, is then measured. Then at 1302 the A2 setting is incremented, or increased by an increment, preferably a small amount, and again the fault rate is determined. At 1303, the change in fault rate is determined and, if the fault rate decreased, the flow returns to 1302 to continue varying the A2 setting in the same direction as before. If, however, the fault rate increased at 1303, then at 1304 the step size, or amount by which the A2 setting is varied, is decreased, such as being ¼ or ¹⁄₁₀ as large is the previous increments, and at 1305 the A2 setting is then decremented or decreased by the reduced step size. Again the fault rate is determined at 1306, and if the fault rate then went down, the flow returns to 1305 to continue decrementing. But if the rate went up at 1306, then at 1307 the final decrement is reversed and the modulation table, with the A2 level so adjusted, is put in use for messaging. At 1308 the method is done.

Figure 14:
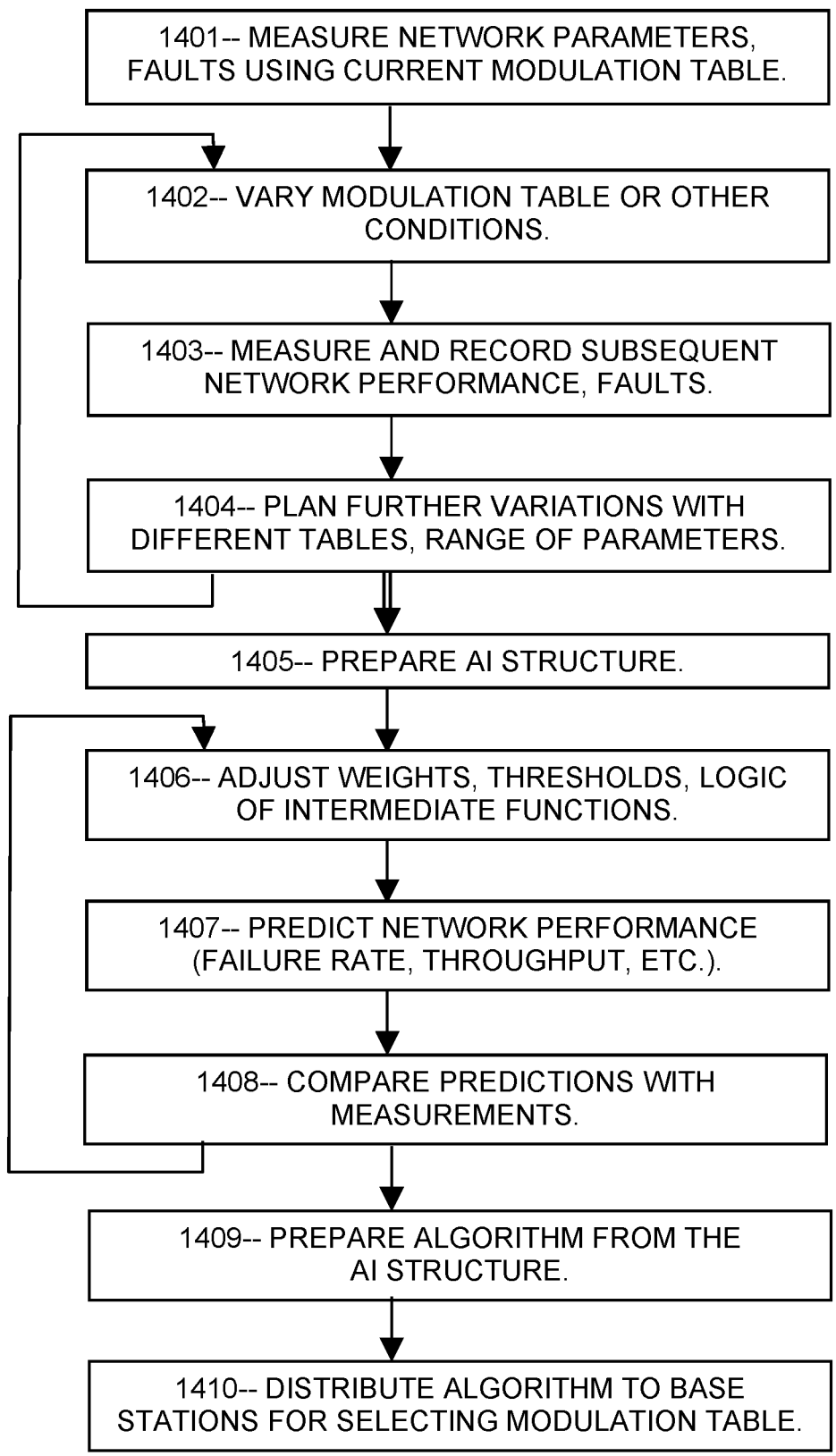
FIG. 14 is a flowchart showing an exemplary embodiment of a method for predicting network performance, according to some embodiments.

FIG. 14 is a flowchart showing an exemplary embodiment of a method for selecting an improved modulation table, according to some embodiments. In this method, a network first accumulates data on network performance and fault distributions with various operating conditions and various modulation tables in use, and then provides the data to a predictive Artificial Intelligence structure. Using the data, certain variables in the AI structure are iteratively adjusted to improve the predictive accuracy of the AI structure. For example, the AI structure could predict a network performance metric such as the fault rate or the throughput minus the rate of retransmission. After the variables in the AI structure have been adjusted to obtain sufficiently accurate predictions of the network performance metric, an algorithm is prepared based on the AI structure, and the algorithm is distributed to the networks for use in selecting which modulation table to use in various situations.

At 1401, a base station or core network measures the current network parameters of a cell or LAN. The measurements may include the current message failure rate, the types of faults observed, the traffic density, and preferably numerous other network parameters, along with a record of which modulation table or tables are in use. Preferably the fault data is recorded for each user node and each modulation table employed at the time of each fault, including the type of fault detected. Other parameters of interest, such as interference from outside the network, may be recorded at 1402. Preferably the data accumulation is continued long enough to record the network conditions and performance under a wide range of conditions at 1402. The resulting network performance is then recorded at 1403 including any faults. Then, optionally, at 1404 the network may plan experiments, such as changing the modulation table or tables in use, or the frequencies or bandwidths or other operational parameters, and so forth. Alternatively, the network may continue to operate normally while continuing to accumulate operational data. The flow then returns to 1402 to take further data as the network responds to any changes. Preferably a substantial database of network conditions, modulation conditions, and resulting performance metrics are accumulated over time, including a wide range of conditions. Other data from other networks may be included, or provided in parallel, so as to expose the AI structure to as many different scenarios as are available in the database. Periodically, or continually, the data may be transferred to a central computer as indicated by a double arrow.

At 1405 a central computer receives the database and prepares (or obtains from elsewhere) an artificial intelligence AI structure, such as a neural net or hidden Markov model or other artificial intelligence means for processing network data and predicting subsequent performance. In particular, the AI structure may be configured to predict how each modulation table, of various available modulation tables, would likely affect the subsequent performance of the network. The AI structure takes in, as inputs, the network data and, preferably, combines it with data from a large number of other base stations as well, thereby to assemble a sufficient number of operational examples under a wide range of network conditions. The inputs of the AI structure may include the operating conditions of the network, fault rates observed, and parameters of the modulation table in use (such as the numbers of levels Namp and Nphase, the separations between them, and any invalid states in the modulation table). The output or outputs may include one or more predicted network performance metrics such as the throughput and failure rate. The intermediate functions are internal functions or routines that perform mathematical and logical operations on the input data and/or on the results of other intermediate functions. The output predictions are then derived from certain of the intermediate functions, such as the lowest layer of intermediate functions. Variables ("values") in the intermediate functions (and optionally the links between them) are then adjusted to cause the predicted network performance metric to become closer to the observed metric, as in "supervised" learning based on the actual performance achieved by the network in each scenario. After the AI structure has achieved sufficient predictive accuracy to predict the subsequent performance of networks to a predetermined accuracy, the AI structure can then be used by the networks themselves, for example to predict how various modulation tables would perform under similar conditions, as well as many other useful tasks. The AI structure, or other calculation means derived from it, can then be used by the base station or core network to compare different available modulation tables for suitability, in view of current network conditions. The predictions can thereby enable network operators to select the most suitable modulation table for subsequent use.

When the AI structure is first prepared, the variables are usually set at arbitrary values at first, and therefore the AI structure usually generates extremely poor predictions before being tuned. The variables can then be adjusted to bring the predicted outputs into better accord with the observed data, which generally results in improved predictive accuracy when new conditions are presented. At 1406, the computer sets or adjusts the AI structure, specifically the weights, thresholds, biases, and optional logic of the intermediate functions, to optimize the accuracy of the predictions. With those settings, at 1407 the computer uses the AI structure to predict the subsequent network performance metric such as the message failure rate, the throughput, and so forth. Then at 1408 the computer, or a supervisory processor, compares the predictions with the network observations. A success factor may be prepared according to the features that the AI structure predicted correctly. The flow then returns to 1406 for more variations of the internal values or further network operational histories. This process continues iteratively to refine the variables of the intermediate functions in order to optimize the success factor, or otherwise improve the predictions.

Upon each iteration, the values in the various intermediate functions may be adjusted to follow any improvements in predictive accuracy. The depicted process may be repeated many times using data from many base stations covering many different operational scenarios. Each successful prediction may form the starting point for extensions to other scenarios, a form of deep learning. In a particular iteration of the method, the values of the intermediate functions may be adjusted in the same direction that they were adjusted in the previous iteration if the predictions were improved thereby, or in the opposite direction if the predictions were less accurate. Alternatively, to avoid getting stuck on local peaks, an arbitrary large change in values may be imposed and the fine-tuning process repeated from that point. Decisions about which variables to vary, and which direction and by how much, may be random or pre-planned or based on the computer's previous experience with similar variations. The iterative adjustment process with feedback from the network data is thus a form of guided learning. If the computer decides which values to vary based on its previous experience, the process is an example of recursive self-improvement.

The adjustment process is generally complex and arduous, requiring advanced software and many hours on extremely competent supercomputers, due to the large number of tightly interacting variables in a problem such as network operation management. Nevertheless, systems exist that can handle such challenges and provide accurate predictions, given sufficient input data to work with. After a sufficiently successful AI structure has been developed, at 1409 an algorithm may be prepared from the results. For example, the algorithm may be the AI structure itself, but with the intermediate function values preferably frozen, so that predictions can be obtained by inserting network operating parameters (such as a particular modulation table) as inputs and calculating the resulting predicted performance. Alternatively, the algorithm may be a simplified or compact version of the AI structure by, for example, pruning the unproductive intermediate functions or input parameters. Alternatively, the algorithm output may be configured to recommend a particular modulation table directly, from a set of available modulation tables, instead of displaying predicted network performance metrics for each table. In that case, the algorithm selects the best modulation table and informs the network of the selection. The selection may be based, for example, on which modulation table would likely provide the highest message throughput or the lowest failure rate or the shortest average delays, of the available modulation tables, given the current operational parameters of the network. The algorithm may be prepared as a computer code, a formula, a table or matrix of values, or other format capable of rendering predictions or recommendations based on the input parameters. The resulting algorithm may then, at 1410, be distributed to the base stations for use in selecting or optimizing their modulation tables under various conditions.

Figure 15:
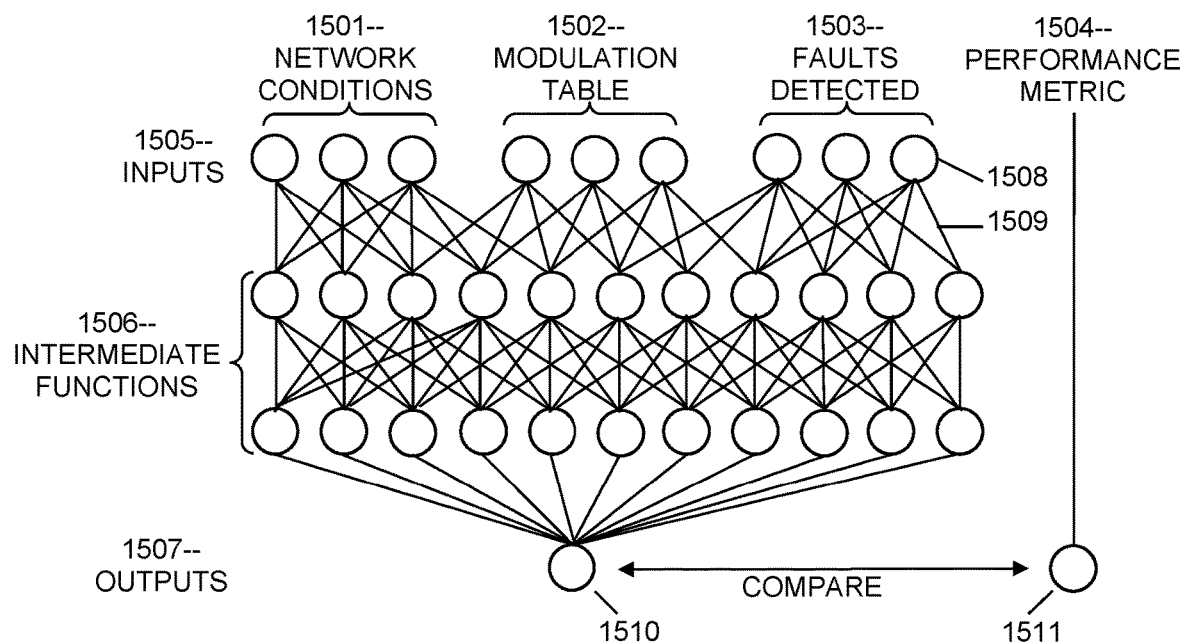
FIG. 15 is a schematic showing elements of an exemplary embodiment of an AI structure, according to some embodiments.

FIG. 15 is a schematic of an exemplary AI structure, arranged in this embodiment for predicting a network performance metric according to input parameters. The depicted case is a neural net, but other AI configurations may be used instead. Variables in the AI structure may be adjusted to cause the predicted performance metric to predict an observed performance metric, preferably with sufficient accuracy that network operators can use the results for selecting modulation tables and other operational parameters. The input parameters 1505 include a number (three shown) of network conditions 1501 such as the number of user nodes, the current traffic density, and an average message size, among many other possible network parameters potentially of interest. The input parameters 1505 also include parameters of a modulation table 1502 such as the number of amplitude levels Namp, the number of phase levels Nphase, noise widths in the amplitude and phase directions, amplitude level separations in the amplitude direction and phase level separations in the phase direction, and whether any of the modulation states are invalid, among other modulation parameters potentially of interest. The input parameters 1505 also include information on message faults detected 1503 by the network, while operating with the network conditions 1501 and modulation table 1502 as specified. The detected faults 1503 may include a number or rate of adjacent-amplitude faults in which a message symbol is distorted by a single amplitude level, adjacent-phase faults in which a symbol is distorted by a single phase level, and non-adjacent faults in which a symbol is distorted by more than a single amplitude or phase level, among other possible fault parameters of interest. Each input parameter 1505 is indicated by a circle 1508. In other embodiments, the fault data 1503 is not provided as input to the AI structure, but rather is predicted by the AI structure as a set of outputs along with other network performance metrics. Artisans may design other AI structures with different architectures after learning about the systems and methods disclosed herein.

The AI structure also includes a number of intermediate functions 1506, arranged in this embodiment as two layers under the inputs 1505, although other embodiments may have more layers and more intermediate functions per layer. The AI structure is arranged to produce an output 1507 which in this embodiment is a predicted network performance metric 1510. The schematic also shows a performance metric column 1504, including an observed network performance metric 1511, which is observed in a network with the network conditions and modulation table listed in the inputs 1505. The performance metric 1511 may be, for example, the message throughput minus ten times the failure rate minus five times the average delay per message, among many other forms of a performance metric of interest to network operators.

Also shown are lines ("links") 1509 connecting the inputs 1505, the intermediate functions 1506, and the output 1507. Each intermediate function 1506 is a function or subroutine or other means for calculating, based on parameters obtained from the inputs 1505 or from another layer of the AI structure, and for feeding results of the calculating to the next layer, and finally to the output 1507. For clarity, the figure shows links connecting only a few of the functions of each layer, but a real AI structure may have links from each function connecting all of the functions of the previous layer and in the subsequent layer. Each of the intermediate functions 1506 includes adjustable variables. The variables may be adjusted to bring the predicted performance metric 1510 into agreement with the observed performance metric 1511 as indicated by the "compare" arrow. For example, a particular variable or set of variables in one or more of the intermediate functions 1506 may be adjusted in a first direction, and the predicted and observed 1510-1511 metrics can be compared to determine if the agreement is better or worse. If better, the adjustment of variables may be repeated or increased in the same direction, and if worse, the adjustment can be turned in the opposite direction. The adjustment can be continued in this iterative fashion until the agreement is satisfactory, or other criterion. The links may also be weighted or otherwise include calculational processes besides that of the intermediate functions. The links in the example are "directed" downward toward the outputs, however other embodiments may include bidirectional links or links sending calculation results upward toward higher layers, or other grid topologies, to address issues such as user response to message failures, among other issues in networking experience.

To provide predictions across a wide range of network scenarios, data from a large number of networks, at a large number of different times, may be applied as well. Each scenario may be used as an input model and tuned individually, thereby deriving a set of values for the intermediate function variables, and optionally the link variables as well. Alternatively, an averaged ("clustered") input may be derived from multiple related scenarios, and the function variables may be adjusted to improve or optimize agreement between each predicted performance metric and the corresponding observed performance metric. After a large number of different scenarios have been satisfactorily predicted, the variable values derived from different scenarios may be combined, such as averaged, to broaden the applicability of the solutions, and the resulting composite set of values may then be tested with additional, preferably novel to the structure, network data. The intent may be to develop an AI structure capable of predicting the effect of changing a modulation table, as well as many other operational decisions, and may thereby assist networks in selecting a suitable modulation table and otherwise managing a torrent of user demands, according to their operating conditions.

When the AI structure has reached a sufficient accuracy, it may be converted to an algorithm for convenient use by networks in selecting or adjusting a modulation table, among other network parameters. Often the AI structure itself is so large and complex, it may be unwieldy for use by a base station or core network in a busy network. Therefore, an algorithm can be configured as a handy and readily usable version of the AI table with sufficient predictive power for general network decision-making. The algorithm may be, for example, the AI structure itself but with the variables frozen at the best combination so far obtained (that is, the set of variables providing the closest agreement between the predicted and observed performance metric across a sufficiently wide range of network conditions and a sufficiently wide range of modulation tables). Alternatively, the algorithm may be a simplified version of the AI structure in which certain inputs and intermediate functions are eliminated if they exhibit little or no correlation with the predicted performance metric. Alternatively, the algorithm may be cast as an analytic function, a computer code, a tabular array which may be multi-dimensional, or other means for providing a predicted performance metric according to the network conditions, modulation table, and faults detected. Networks (specifically base stations or core networks) can then use the algorithm to predict performance with each of a number of available modulation tables, determine which table is predicted to provide the best performance according to the metric, and then switch to that modulation table.

Figure 16:
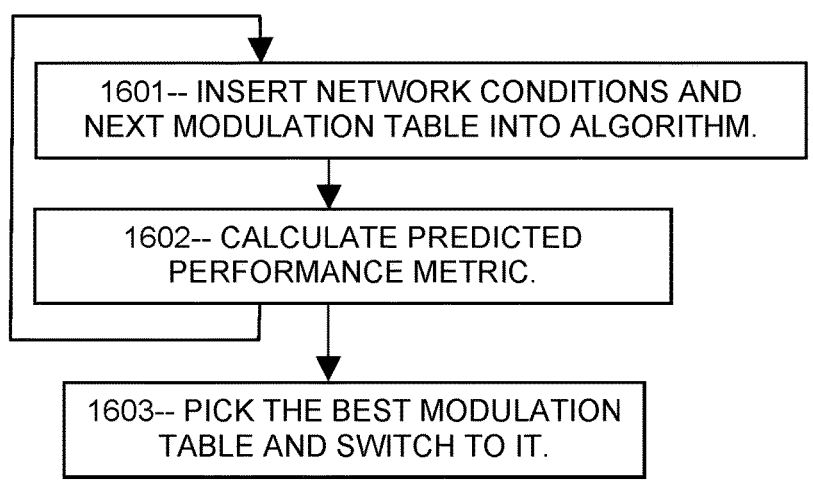
FIG. 16 is a flowchart showing an exemplary embodiment of a method for selecting a particular modulation table, according to some embodiments.

FIG. 16 is a flowchart showing an exemplary method for using an algorithm based on an AI structure, such as that of FIG. 15. At 1601, parameters such as network conditions and observed fault rates are used as inputs to the algorithm. A first modulation table is assumed. At 1602 the algorithm is used to predict the performance metric for the input scenario and with the first modulation table. Those steps may be repeated for a second modulation table, and for each of the modulation tables available to the network. After predicting performance metrics from all of the available modulation tables, at 1603 the best modulation table (whichever modulation table would provide the highest predicted performance metric) may be selected and activated in the network. The method may be repeated whenever network conditions change.

Figure 17:
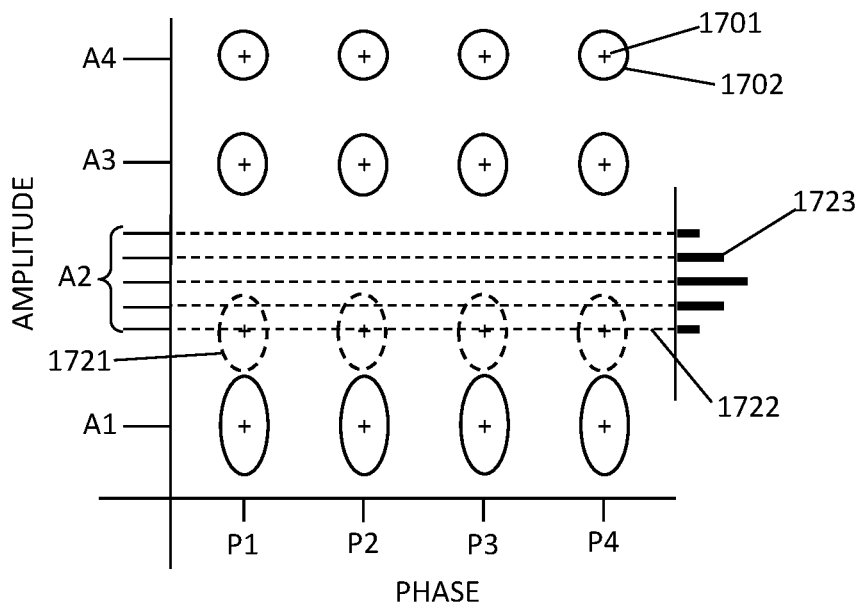
FIG. 17 is a schematic showing an exemplary embodiment of a modulation table with variable amplitude level spacings, according to some embodiments.

FIG. 17 is a schematic of an exemplary modulation table having a variable amplitude level, according to some embodiments. As in the previous schematics, the amplitude is shown on the vertical axis and the phase on the horizontal axis, with each modulation state shown as a "+" 1701 surrounded by a noise contour 1702. One of the amplitude levels, A2, is rendered at five different values, shown as dashed lines 1722 corresponding to five settings of the A2 amplitude setting. The states and noise contours for one exemplary setting of the A2 amplitude are shown in dash 1721. The A2 level may be set at any one of the five values depicted. On the right are five bars 1723 indicating the network performance metric obtainable with each of the respective A2 level settings, respectively. The indicated network performance metrics 1723 may be the predictions of an algorithm such as that of FIG. 16, or they may be obtained experimentally by the network in trying out each of the level settings 1721. The longest bar (shown in the middle of the distribution 1723 in this case) indicates that the best performance is obtainable by setting the A2 level at the indicated value. Apparently the other settings are either too high or too low, and thus are too close to the adjacent levels A1 and A3, resulting in more faults than the favored choice.

Figure 18:
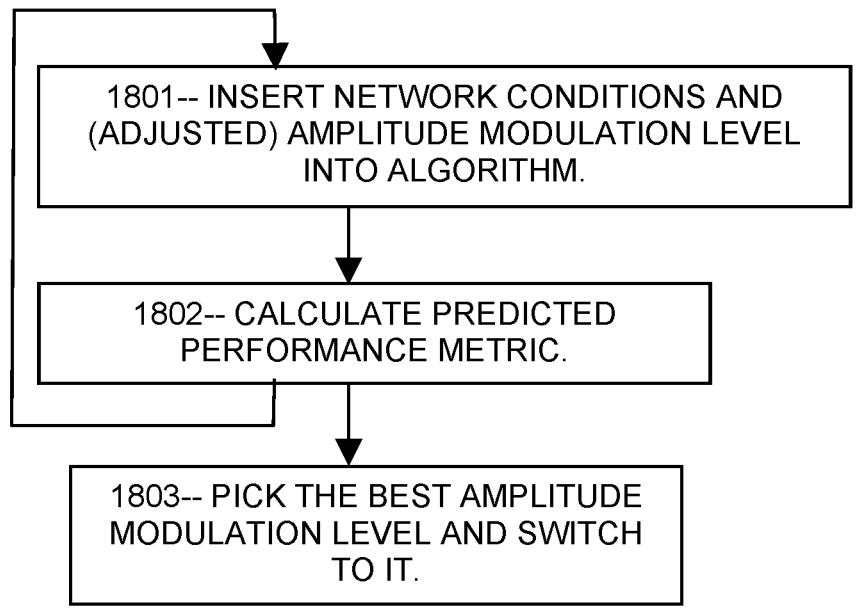
FIG. 18 is a flowchart showing an exemplary embodiment of a method for adjusting a variable amplitude level of a modulation table, according to some embodiments.

FIG. 18 is a flowchart showing an exemplary method for setting an amplitude modulation level, or other network parameter, using an AI-derived algorithm, according to some embodiments. At 1801, the network conditions, faults detected including type, and a modulation table including the current value of an adjustable amplitude level, are provided as inputs to an algorithm. At 1802, the algorithm is used to predict a network performance metric by performing calculations or the like, related to the inputs. Steps 1801 and 1802 are repeated a plurality of times, using a different value for the adjustable amplitude level, thereby obtaining a plurality of predicted network performance metrics. At 1803, the best predicted network performance metric is determined and the associated amplitude level setting is determined. The modulation table, with the amplitude level (or levels) so adjusted, is then employed for wireless communications.

AI structures, such as that shown in FIG. 15 or described elsewhere herein, can provide a wide range of services to network operators. For example, AI structures can be adapted to solve allocation problems such as determining which user node to provide resources based on traffic density, the size of the waiting messages, the priority of the waiting user nodes, and many other factors that can change on a millisecond basis. The network is responsible for allocating resources (transmission opportunities and scheduling) to the highest priority user nodes first, yet without starving the low-priority user nodes, and providing a sufficient response to each user. Some high-priority user nodes may require very low latency, whereas others may require high reliability but a more leisurely response, while others may require both speed and reliability. Some user nodes, such as massively parallel machine-type sensors and the like, may require few resources at infrequent intervals, yet may strain the network due to their large total numbers. Adjacent networks, sharing similar frequency bands, may cause interference with some or all of the network's users. Beamforming may alleviate some of these problems but with added complexity, especially since each user node will likely have different beam capabilities and a different scattering environment. AI can help resolve many of these challenges, or at least provide workable options in many cases, by applying methods and structures disclosed herein. After reading the examples taught above, artisans may develop AI structures for managing network scheduling to provide optimal throughput, or other performance metric, under a wide range of operating conditions, by tuning the variables of the AI structure to provide performance predictions or operational choices according to real-world data acquired by the networks. In addition, artisans can condense a successfully developed AI structure into a usable algorithm, which the network operators can then use for decision-making in realtime. In addition, the same networks can record the subsequent performance and operational parameters, and return that data for continuing development and updating of the AI structure, and thereby enable better networking in the future.

The systems and methods may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touchscreen, joystick, trackpad, other pointing device, or any other such computer input device to input data relevant to the calculations. Data may also be input by way of one or more sensors on the robot, an inserted memory chip, hard drive, flash drives, flash memory, optical media, magnetic media, or any other type of file—storing medium. The outputs may be delivered to a user by way of signals transmitted to robot steering and throttle controls, a video graphics card or integrated graphics chipset coupled to a display that maybe seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or WiFi-connected device downloads a copy of the application to their device from a server using a wireless Internet connection. An appropriate authentication procedure and secure transaction process may provide for payment to be made to the seller. The application may download over the mobile connection, or over the WiFi or other wireless network connection. The application may then be run by the user. Such a networked system may provide a suitable computing environment for an implementation in which a plurality of users provide separate inputs to the system and method.

Embodiments of the systems and methods disclosed herein can provide numerous advantages not obtainable from prior-art wireless protocols. Embodiments may provide increased throughput and/or reduced message failure rates by allowing nodes to transmit using asymmetric or non-square modulation tables that mitigate specific types of faults, such as amplitude or phase faults, faults concentrated in certain portions of the modulation table, and pulsatile interference, among many other possible fault characteristics. Network operators can use methods and algorithms derived from operational data and, optionally, AI modeling, to select and fine-tune modulation table parameters as well as other network parameters to optimize performance in various ways.

In the coming years, the number of wireless networks and devices is expected to increase exponentially as 5G is rolled out, increasing even more as future technologies such as 6G are developed. For this reason, the need for efficient utilization of the shared radio medium is expected to become severe. Asymmetric modulation tables, implemented as disclosed herein, may provide means for reducing message failures while enhancing throughput, with AI-assisted selection and optmization of the modulation table for current network parameters, according to some embodiments.

It is to be understood that the foregoing description is not a definition of the invention but is a description of one or more preferred exemplary embodiments of the invention. The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. A method for a base station of a wireless network, the method comprising:
  a) using a first modulation scheme comprising Nstate modulation states, each modulation state comprising amplitude modulation according to integer Namp predetermined amplitude levels;
  b) receiving multiple uplink messages, each uplink message comprising symbols, each symbol occupying one resource element of a resource grid, each symbol modulated according to the first modulation scheme;
  c) determining a rate of adjacent-amplitude faults and a rate of nonadjacent-amplitude faults, wherein:
    i) an adjacent-amplitude fault comprises a symbol transmitted according to a first predetermined amplitude level and received according to a second predetermined amplitude level adjacent to the first predetermined amplitude level;
    ii) a nonadjacent-amplitude fault comprises a symbol transmitted according to a first predetermined amplitude level and received according to a second predetermined amplitude level which is not adjacent to the first predetermined amplitude level; and
  d) selecting a second modulation scheme according to the rate of adjacent-amplitude faults and the rate of nonadjacent-amplitude faults.

2. The method of claim 1, wherein the uplink messages are received according to 5G or 6G technology.

3. The method of claim 1, further comprising:
  a) when the rate of adjacent-amplitude faults is greater than the rate of nonadjacent-amplitude faults, selecting the second modulation scheme with fewer than Namp predetermined amplitude levels; and
  b) when the rate of nonadjacent-amplitude faults is greater than the rate of adjacent-amplitude faults, selecting the second modulation scheme with more than Namp predetermined amplitude levels.

4. The method of claim 1, further comprising:
  a) determining a rate of high-amplitude faults and a rate of low-amplitude faults, wherein:
    i) a high-amplitude fault comprises a symbol transmitted according to a first predetermined amplitude level and received according to a different second predetermined amplitude level, and the first predetermined amplitude level is higher than a predetermined amplitude threshold; and
    ii) a low-amplitude fault comprises a symbol transmitted according to a first predetermined amplitude level and received according to a different second predetermined amplitude level, and the first predetermined amplitude level is lower than the predetermined amplitude threshold.

5. The method of claim 4, wherein the selecting a second modulation scheme is further according to the rate of high-amplitude faults and the rate of low-amplitude faults.

6. The method of claim 5, further comprising:
  a) when the rate of high-amplitude faults is greater than the rate of low-amplitude faults, selecting the second modulation scheme with fewer than Namp predetermined amplitude levels; and
  b) when the rate of high-amplitude faults is less than the rate of low-amplitude faults, selecting the second modulation scheme wherein one or more of the Nstates, having amplitudes lower than the predetermined amplitude threshold, are removed or made unavailable for modulation.

7. The method of claim 4, further comprising:
  a) providing, as inputs to an artificial intelligence model, at least the rate of adjacent-amplitude faults and the rate of nonadjacent-amplitude faults; and b) determining, as an output of the artificial intelligence model, the second modulation scheme.

8. The method of claim 7, wherein the inputs further comprise the rate of high-amplitude faults and the rate of low-amplitude faults.

9. The method of claim 7, further comprising:
a) determining, as further outputs from the artificial intelligence model, a first prediction of a first performance metric of the wireless network according to the first modulation scheme, and a second prediction of a second performance metric of the wireless network according to the second modulation scheme;
b) wherein the performance metric comprises, at least, an expected rate of message faults.

10. A method for a user device of a wireless network, the method comprising:
a) receiving downlink messages comprising symbols, each symbol occupying a single resource element of a resource grid and modulated according to a first modulation scheme comprising amplitude modulation according to Namp predetermined amplitude levels;
b) determining a rate of message faults in the downlink messages, wherein a message fault comprises a symbol transmitted according to a first amplitude level and measured, by the user device, according to a different second amplitude level;
c) transmitting, to a base station of the wireless network, an uplink message indicating the rate of message faults; and
d) receiving, from the base station, an RRC (radio resource control) message recommending a second modulation scheme.

11. The method of claim 10, further comprising:
a) for each message fault, determining whether the message fault is an adjacent-amplitude fault or a nonadjacent-amplitude fault, wherein:
   i) an adjacent-amplitude fault comprises a symbol transmitted according to a first predetermined amplitude level and received according to a second predetermined amplitude level adjacent to the first predetermined amplitude level;
   ii) a nonadjacent-amplitude fault comprises a symbol transmitted according to a first predetermined amplitude level and received according to a second predetermined amplitude level which is not adjacent to the first predetermined amplitude level; and
b) including, in the uplink message, an indication of the rate of adjacent-amplitude faults and the rate of nonadjacent-amplitude faults.

12. The method of claim 10, further comprising:
a) determining a rate of high-amplitude faults and a rate of low-amplitude faults;
b) wherein a high-amplitude fault comprises a symbol transmitted according to a first predetermined amplitude level and received according to a different second predetermined amplitude level, and the first predetermined amplitude level is higher than a predetermined amplitude threshold; and
c) wherein a low-amplitude fault comprises a symbol transmitted according to a first predetermined amplitude level and received according to a different second predetermined amplitude level, and the first predetermined amplitude level is lower than the predetermined amplitude threshold.

13. The method of claim 12, further comprising including, in the uplink message, an indication of the rate of high-amplitude faults and the rate of low-amplitude faults.

14. The method of claim 12, further comprising:
a) providing, as input to an artificial intelligence model, or to an algorithm derived from an artificial intelligence model, at least the rate of high-amplitude faults and the rate of low-amplitude faults, and determining, as output from the artificial intelligence model, a recommendation of a second modulation scheme different from the first modulation scheme.

15. The method of claim 14, further comprising:
a) including, in the uplink message, a request that the base station transmit future downlink messages to the user device according to the second modulation scheme.

16. A method for a core network of a wireless network to improve network performance, the method comprising:
a) using an artificial intelligence model configured to take, as input, at least a current modulation scheme and a current message fault rate, and to provide, as output, at least a suggested modulation scheme and a predicted fault rate according to the suggested modulation scheme.

17. The method of claim 16, further comprising providing, as further inputs to the artificial intelligence model, data on message fault rates in uplink messages, and data on message fault rates in downlink messages.

18. The method of claim 16, further comprising transmitting, to at least one other core network, the current modulation scheme, the suggested modulation scheme, the current message fault rate, and the predicted message fault rate.

19. The method of claim 16, further comprising receiving, from at least one other core network, data on modulation schemes used by the at least one other core network, and data on fault rates determined or predicted by the at least one other core network.

20. The method of claim 16, further comprising:
a) determining a rate of adjacent-amplitude faults, a rate of nonadjacent-amplitude faults, a rate of high-amplitude faults, and a rate of low-amplitude faults, wherein each of the listed types of faults comprises a different disagreement between a transmitted modulation and a received modulation of a message symbol; and
b) providing, as further input to the artificial intelligence model, the rate of adjacent-amplitude faults, the rate of nonadjacent-amplitude faults, the rate of high-amplitude faults, and the rate of low-amplitude faults.

* * * * *